(12) United States Patent
Simard

(10) Patent No.: US 12,099,931 B2
(45) Date of Patent: *Sep. 24, 2024

(54) DIFFERENTIAL RECURRENT NEURAL NETWORK

(71) Applicant: Microsoft Technology Licensing, LLC, Redmond, WA (US)

(72) Inventor: Patrice Simard, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,989

(22) Filed: Jun. 14, 2023

(65) Prior Publication Data

US 2023/0325674 A1 Oct. 12, 2023

Related U.S. Application Data

(63) Continuation of application No. 16/860,555, filed on Apr. 28, 2020, now Pat. No. 11,720,797, which is a (Continued)

(51) Int. Cl.
*G06N 3/084* (2023.01)
*G06F 18/24* (2023.01)
(Continued)

(52) U.S. Cl.
CPC .............. *G06N 3/084* (2013.01); *G06F 18/24* (2023.01); *G06N 3/044* (2023.01); *G06V 10/764* (2022.01); *G06V 10/82* (2022.01)

(58) Field of Classification Search
CPC ........ G06N 3/084; G06N 3/044; G06V 10/82; G06V 10/764; G06F 18/24
See application file for complete search history.

(56) References Cited

U.S. PATENT DOCUMENTS 9,263,036 B1 * 2/2016 Graves ................... G10L 15/16
10,032,498 B2 * 7/2018 Neil ........................ G06N 3/084
(Continued)

OTHER PUBLICATIONS

"Understanding LSTM Networks", Retrieved from: http://colah.github.io/posts/2015-08-Understanding-LSTMs/, Aug. 27, 2015, 8 Pages.

*Primary Examiner* — Utpal D Shah

(57) ABSTRACT

A differential recurrent neural network (RNN) is described that handles dependencies that go arbitrarily far in time by allowing the network system to store states using recurrent loops without adversely affecting training. The differential RNN includes a state component for storing states, and a trainable transition and differential non-linearity component which includes a neural network. The trainable transition and differential non-linearity component takes as input, an output of the previous stored states from the state component along with an input vector, and produces positive and negative contribution vectors which are employed to produce a state contribution vector. The state contribution vector is input into the state component to create a set of current states. In one implementation, the current states are simply output. In another implementation, the differential RNN includes a trainable OUT component which includes a neural network that performs post-processing on the current states before outputting them.

20 Claims, 20 Drawing Sheets

State Component

Differential Recurrent Neural Network

Differential Non-Linearity

Related U.S. Application Data continuation of application No. 15/488,221, filed on Apr. 14, 2017, now Pat. No. 10,671,908.

(60) Provisional application No. 62/426,153, filed on Nov. 23, 2016.

(51) Int. Cl.
  *G06N 3/044* (2023.01)
  *G06V 10/764* (2022.01)
  *G06V 10/82* (2022.01)

(56) References Cited

U.S. PATENT DOCUMENTS 10,176,799 B2 * 1/2019 Hori .............. G06N 3/044
10,387,769 B2 * 8/2019 Neil .............. G06F 15/82

* cited by examiner

DIFFERENTIAL RECURRENT NEURAL NETWORK

CROSS REFERENCE TO RELATED APPLICATIONS

This application is a continuation of U.S. patent application Ser. No. 16/860,555, filed Apr. 28, 2020, which is a continuation of U.S. patent application Ser. No. 15/488,221 filed Apr. 14, 2017, now U.S. Pat. No. 10,671,908, which claims priority to U.S. Provisional Patent Application No. 62/426,153, filed Nov. 23, 2016, the entirety of each of which is hereby incorporated herein incorporated by reference for all purposes.

BACKGROUND

Convolutional networks can easily handle dependencies over a window, but cannot handle dependencies that go arbitrarily far in time because they have no mechanism to store information. This is a deficiency that prevents them from effectively tackling many applications including processing text, detecting combination of events, learning finite state machines, and so on.

Recurrent neural networks (RNNs) brought the promise of lifting this limitation by allowing the system to store states using recurrent loops. However, RNNs suffer from a basic limitation pertaining to training them using gradient descent. To store states robustly in a recurrent loop, the state must be stable to small state deviations, or noise. However, if a RNN robustly stores the state, then training it with gradient descent will result in gradients vanishing in time and so training is difficult.

In the past, two ways of circumventing this training issue were developed. One way is to build an architecture that makes it easy to keep the eigenvalues very close to 1 (i.e., using gating functions computed by a sigmoid which are almost 1 when saturated). Another way is to cheat on gradient descent using common known tricks such as gradient capping, truncated gradient, gradient normalization through regularization, and so on. Long Short Term Memory (LSTM) and Gate Recurrent Unit (GRU) systems are examples of previous schemes that took advantage of both of these circumventing methods in an attempt to overcome the training issue.

SUMMARY

Differential recurrent neural network (RNN) implementations described herein generally concern a type of neural network that handles dependencies that go arbitrarily far in time by allowing the network system to store states using recurrent loops, but without adversely affecting training. In one implementation, the differential RNN includes a state component sub-program for storing states. This state component sub-program includes a state loop with an adder for each state. For each state being stored, the state component sub-program modifies and stores a current state by adding the previous stored state to a corresponding element of a state contribution vector output by a trainable transition and differential non-linearity component sub-program using the associated state loop and adder each time an input vector is input into the differential RNN. During backpropagation, the state component sub-program accumulates gradients of a sequence used to train the differential RNN by adding them to the previous stored gradient and storing the new gradient at each time step starting from the end of the sequence.

The trainable transition and differential non-linearity component sub-program includes a neural network. In one implementation, this neural network is regularized to a linear function. The trainable transition and differential non-linearity component sub-program takes as an input, an output of the previous stored states from the state component sub-program along with an input vector, whenever an input vector is entered into the differential RNN. The trainable transition and differential non-linearity component sub-program then produces a positive contribution vector and a negative contribution whose elements each correspond to a different element of the states being stored in the state component sub-program.

The trainable transition and differential non-linearity component sub-program employs the positive and negative contribution vectors to produce and output a state contribution vector that is then input into the state component sub-program. Each element of the state contribution vector is computed as the difference of a function of a positive contribution value for a corresponding element in the positive contribution vector and the function of a negative contribution value for the corresponding element in the negative contribution vector. This function is such that whenever the positive contribution vector equals the negative contribution vector, the state contribution vector represents the identity matrix. In addition, the function is such that whenever the positive contribution value for an element in the positive contribution vector is less than or equal to 0 and the negative contribution value for the corresponding element in the negative contribution vector is greater than or equal to 0, the corresponding state contribution vector element is 0.

In one implementation, the differential RNN further includes an output that outputs the current states from the state component sub-program. In another implementation, the differential RNN further includes a trainable OUT component sub-program which includes a neural network. In one implementation, this neural network is regularized to a linear function. The trainable OUT component sub-program takes as input the aforementioned current states output from the state component sub-program. It then performs post-processing on these current states to produce a set of post-processed states. The post-processed states are output from an output of the differential RNN.

In one implementation, the differential RNN operates on one or more computing devices. These computing devices are in communication with each other via a computer network whenever there is a plurality of computing devices. In addition, the differential RNN includes a computer program having a plurality of sub-programs executed by the computing devices. In another implementation, the differential RNN operates on a computing device and a computer program having a plurality of sub-programs executed by the computing device.

A computer-implemented system and process is employed for training the differential RNN. This involves using one or more computing devices, where the computing devices are in communication with each other via a computer network whenever a plurality of computing devices is used. The training generally involves receiving a plurality of training sequence vectors. Each of the training sequence vectors includes multiple groups of elements, and each of these groups corresponds to a different time step. In one implementation, for each of the plurality of training sequence vectors, the following process actions are performed.

The elements of the training sequence vector corresponding to a current time step (which is initially the first time step in the sequence of time steps) is provided to the trainable transition component of the differential RNN. As indicated previously, the trainable transition component includes a neural network. A current version of a state vector stored by a state component of the differential RNN is also provided to the trainable transition component. The current version of the state vector has elements, each of which corresponds to a different element of the states being stored by the state component. The output of the trainable transition component includes a positive contribution vector and a negative contribution vector. Each of these vectors has elements, each of which corresponds to a different element of the states being stored by the state component. The last-captured output of the trainable transition component is provided to the differential non-linearity component of the differential RNN. The output of the differential non-linearity component is then captured. This output includes a state contribution vector having elements, each of which corresponds to a different element of the states being stored by the state component. The last-captured state contribution component is provided to the state component which outputs an updated version of the state vector computed from the previous version of the state vector and the last-captured state contribution vector. The output of the state component is designated as a sequence output vector associated with the elements of the training sequence vector corresponding to a current time step. It is next determined if the elements of the training sequence vector corresponding to the current time step represent the elements of the last time step of the sequence of time steps. If not, the time step is incremented, and the foregoing actions starting with providing elements of the training sequence vector corresponding to the current time step are repeated until the elements of the training sequence vector corresponding to the current time step do represent the elements of the last time step of the sequence of time steps.

Next, for each sequence output vector in reverse time step order, starting with the sequence output vector corresponding to the last time step of the sequence of time steps, a cost function is computed based on the similarity between the sequence output vector under consideration and the associated elements of the training sequence vector corresponding to the same time step. A gradient vector is computed using the last-computed cost function. The gradient vector has elements, each of which corresponds to a different one of the states being stored by the state component.

During backpropagation, the last-computed gradient vector is provided to an output side of the state component of the differential RNN. The last-computed gradient vector is then combined with a last previously-stored gradient vector to produce a current accumulated gradient vector. The current accumulated gradient vector is then stored by the state component. A copy of the last-stored current accumulated gradient vector is provided to an output side of the differential non-linearity component, which in turn provides the copy to each branch of an adder. One copy is multiplied by the derivative of a first non-linearity function and the other copy is multiplied by a second non-linearity function, to produce a positive contribution gradient vector and a negative contribution gradient vector. The positive and negative contribution gradient vectors are then provided to an output side of the trainable transition component. These positive and negative contribution gradient vectors are employed by the trainable transition component to modify the weigh matrix of the neural network via a normal back-propagation procedure in order to eventually train the neural network. It is next determined if the sequence output vector under consideration corresponds to the first time step of the sequence of time steps. If not, then the sequence output vector corresponding to the time step immediately preceding the one associated with the last-considered sequence output vector is taken under consideration, and the foregoing actions starting with computing the cost function are repeated until the last-considered sequence output vector corresponds to the first time step of the sequence of time steps.

Each element of the gradient vector corresponds to a different state being stored by the state component. In one implementation, each gradient element is also normalized by dividing the element by a function of the current time step value. The function could be linear such as the time stamp or non-linear such as the square root of the time stamp. Each gradient element of the vector (normalized or not) is fed into the output side of the state component. The gradient vector entering the element is added to the current and existing gradient value vector in the state component during the backpropagation. At each time step, the accumulated gradient vector is duplicated and is fed to the output side of the differential non-linearity component.

Also during backpropagation, the differential non-linearity component of the differential RNN receives a gradient from its output. The gradient vector is copied to each branch of the adder and multiplied by the derivative of two non-linearity functions to produce two gradient vectors of the objective function, one with respect to the positive state component contribution vector and one with respect to the negative state component contribution vector.

In one embodiment, the gradient vector is multiplied by the derivative of an approximation of the non-linear functions instead of the true derivative. Such approximation can be obtained by smoothing the non-linear function. The purpose of this approximation is to improve the convergence of the gradient descent method by increasing the curvature of the Hessian of the objective function in regions where it would otherwise be flat.

The positive and negative contribution gradient vectors are fed from the output of the trainable transition component of the differential RNN. The trainable transition component includes a neural network which is trained by using the gradient vector signals from its output to modify the weight matrix of the neural network via a backpropagation procedure.

It is noted that the gradients with respect to the external input can be backpropagated though the trainable OUT component to the input, if the input was created outside the differential recurrent unit using a trainable component. It is also noted that the gradients computed by the trainable transition component with respect to the input corresponding to the output of the state component can be fed to output of the state component. In an alternative embodiment, the gradient is simply discarded or altered to prevent it from traveling backward indefinitely along the loop that includes the state component, the differential non-linearity, and the trainable transition component.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the differential recurrent neural network (RNN) implementations described herein will become better understood with regard to the following description, appended claims, and accompanying drawings where:

DETAILED DESCRIPTION

Figure 1:
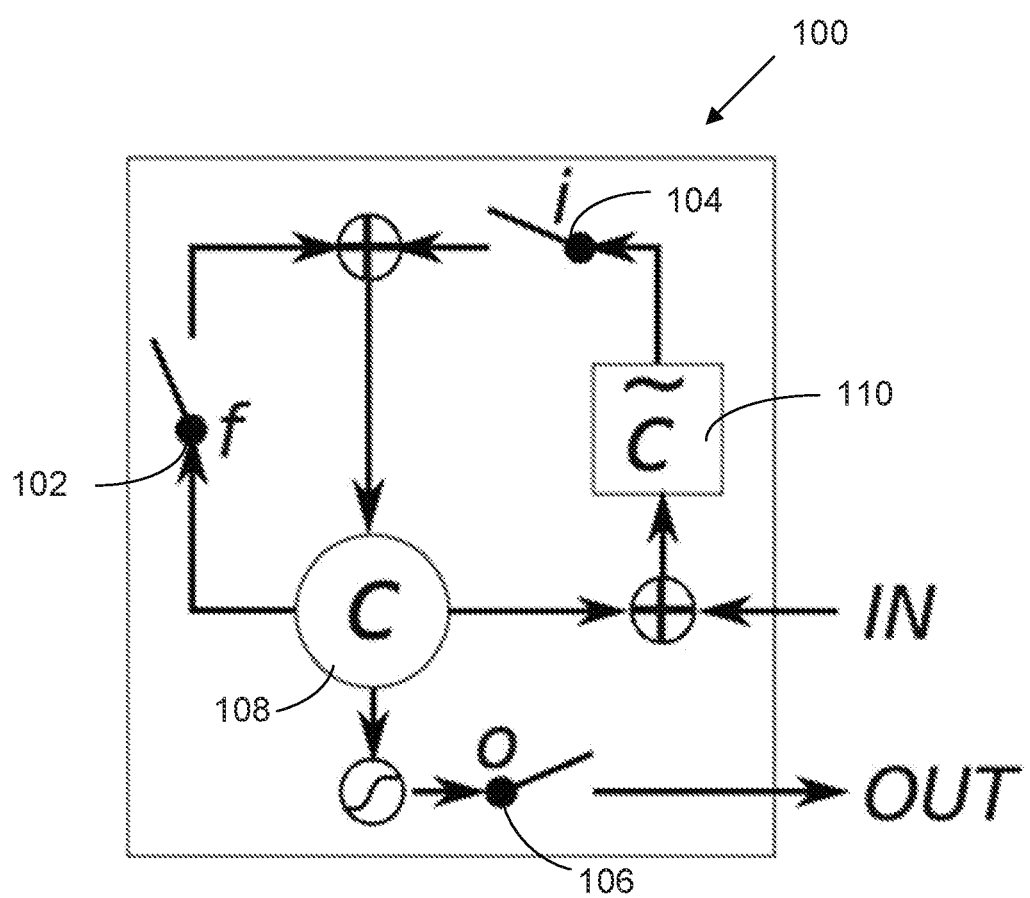
FIG. 1 is a diagram illustrating a simplified version of a long short term memory (LSTM) system.

In the following description of the differential recurrent neural network (RNN) implementations reference is made to the accompanying drawings which form a part hereof, and in which are shown, by way of illustration, specific implementations in which the differential RNN can be practiced. It is understood that other implementations can be utilized and structural changes can be made without departing from the scope of the differential RNN implementations.

It is also noted that for the sake of clarity specific terminology will be resorted to in describing the differential RNN implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the Differential RNN. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the differential RNN does not inherently indicate any particular order nor imply any limitations of the differential RNN.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Introduction

As described previously, recurrent neural networks (RNNs) brought the promise of handling dependencies that go arbitrarily far in time by allowing the system to store states using recurrent loops. However, to store states robustly in a recurrent loop, the state must be stable to small state deviations, or noise. If the function F that computes the next state $x^{t+1}$ as a function of the previous state $x^t$ and an input $i^t$ is defined by:

$$x^{t+1} = F(w, x^t, i^t) \qquad (1)$$

Stability around a fixed point a=F(W,a,i), can be expressed as:

$$\exists r \in \mathbb{R} \text{ s.t.} \forall x^0 \in \mathbb{R}^n, \|x^0 - a\| < r \Rightarrow \forall t > 0, \frac{\|x^{t+1} - a\|}{\|x^t - a\|} \leq 1 \qquad (2)$$

In other words, a small perturbation x from a within radius r in any direction, cannot get further from a under the mapping F. If the above is true for all $x^0$ near a, the following equivalent statement can be inferred (using $\delta = x^0 - a$, $x^{t+1} = F(W, x^t, i)$, a=F(W,a,i) and the definition of a limit):

$$\forall \delta \in \mathbb{R}^n, \lim_{\epsilon \to 0} \frac{\|F(W, a+\epsilon\delta, i) - F(W, a, i)\|}{\epsilon \|\delta\|} \leq 1 \qquad (3)$$

The following 4 statements are equivalent:

The RNN's Recurrent Function F Store States Robustly $$\forall \delta \in \mathbb{R}^n, \lim_{\epsilon \to 0} \frac{\|F(W, a+\epsilon\delta, i) - F(W, a, i)\|}{\epsilon \|\delta\|} \leq 1$$

$$\forall \delta \in \mathbb{R}^n, \left\| \frac{\partial F(W, x, i)}{\partial x} \delta \right\| \leq \|\delta\|$$

All the eigenvalues of the Jacobian $$\frac{\partial F(W, x, i)}{\partial x}$$

are less or equal to 1

The basic limitation with training a RNN with backpropagation stems from the fact that the gradient vector $g^t$ is computed using the equation:

$$g^t = \left( \frac{\partial F(W, x^t, i^t)}{\partial x^t} \right)^T g^{t+1} + \frac{\partial E(G(x^t), \text{target}^t)}{x^t} \qquad (4)$$

Where $$\left( \frac{\partial F(W, x^t, i^t)}{\partial x^t} \right)^T$$

is the transpose of $$\frac{\partial F(W, x^t, i^t)}{\partial x^t}, \text{ and } \frac{\partial E(G(x^t), \text{target}^t)}{x^t}$$

is the gradient injected by the objective function E, the target value $\text{target}^t$ for the output $G(x^t)$ at time t. The eigenvalues of a matrix and its transpose are identical. The following 3 statements are also equivalent:

$$\forall g \left\| \left( \frac{\partial F(W, i, x)}{\partial x} \right)^T g \right\| < \|g\|$$

All the eigenvalues of the Jacobian $$\frac{\partial F(W, i, x)}{\partial x}$$

are less than 1

The Backpropgation of the Gradients Through F is Vanishing in Time

If a RNN can robustly store state, then training it with gradient descent will result in gradients vanishing in time and will be difficult.

As indicated previously, two of the ways that were developed to circumvent this issue where:
1) Building an architecture that makes it easy to keep the eigenvalues very close to 1 (use gating function computed by sigmoid which are almost 1 when saturated); and
2) Cheating on gradient descent (using common known tricks such as gradient capping, truncated gradient, gradient normalization through regularization, etc.)

Long Short Term Memory (LSTM) and Gate Recurrent Unit (GRU) systems are examples of previous schemes that took advantage of both of these circumventing methods in an attempt to overcome the training issue.

1.1 LSTMs

The novelty in LSTM networks came from using gating functions implemented with logistic functions, which guaranteed that the recurrent loop had a gain of almost 1. A simplified version of an LSTM 100 is depicted in FIG. 1, where $f$ 102, i 104 and o 106 are gating functions; C 108 represents a stored state; and c̃ 110 is a function that computes the incremental change in the stored state for the current time period t. This figure, however, does not reflect the fact that the functions $f^t$, $i^t$, $\widetilde{C^t}$, and $o^t$ all depend on both the previous output and the current input.

Figure 2:
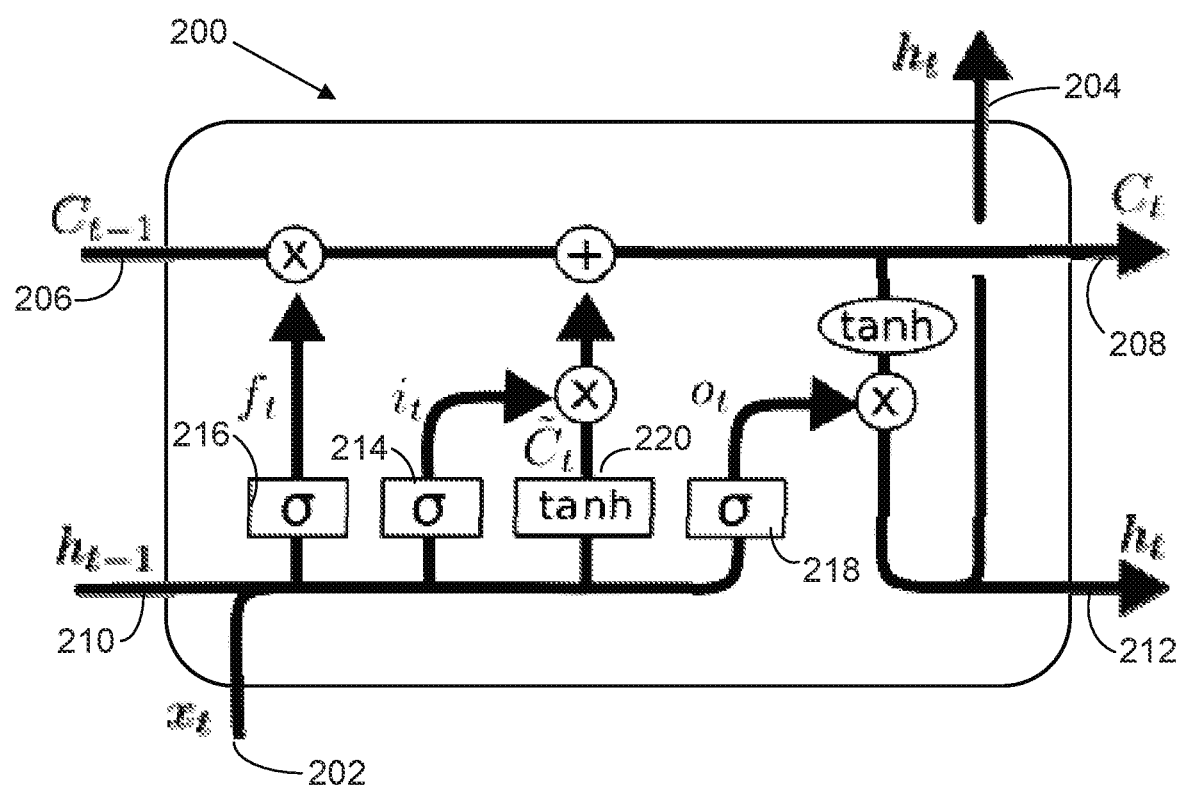
FIG. 2 is a diagram illustrating one implementation of the LSTM of FIG. 1, which better highlights the dependencies.

FIG. 2 illustrates an example LSTM 200 that better highlights the dependencies. $x_t$ 202 is the input and $h_t$ 204 is the output. The top-left arrow coming in the middle component is $C_{t-1}$ 206, the top-right arrow coming out of the middle component is $C_t$ 208, the bottom-left arrow coming in the middle component is $h_{t-1}$ 210, and the bottom-right arrow coming out of the middle component is $h_t$ 212.

The i 214, $f$ 216, and o 218 gates are respectively called input, forget, and output gates. They are implemented by:

$$f_t = \sigma(W_f \cdot [h_{t-1}, x_t] + b_f) \qquad (5)$$

$$i_t = \sigma(W_i \cdot [h_{t-1}, x_t] + b_i) \qquad (6)$$

$$\tilde{C}_t = \tanh(W_C \cdot [h_{t-1}, x_t] + b_C) \qquad (7)$$

$$C_t = f^t * C_{t-1} + i^t * \tilde{C}_t \qquad (8)$$

-continued $$o_t = \sigma(W_o \cdot [h_{t-1}, x_t] + b_o) \quad (9)$$

$$h_t = 0_t * \tanh(C_t) \quad (10)$$

$$\sigma(x) = \frac{1}{1 + e^{-x}} \quad (11)$$

The functions $f_t$, $i_t$, $\tilde{C}_t$, and $o_t$ all depend on $[h_{t-1}, x_t]$, which is the concatenation of the previous output $h_{t-1}$ 210 and the current input $x_t$ 202. The state loop, which computes the new $C_t$ 208 from the previous $C_t$ and $\tilde{C}_t$ 220, is implemented through the functions $f$ 216 (forget) and $i$ 214 (input). The gain of that loop is 1 if $f=1$ and $i=0$ ($f$ and $i$ are vectors, the notation is abused in that it uses 1 instead of $[1, \ldots, 1]$ and 0 instead of $[0, \ldots, 0]$). If $f<1$ and $i=0$ for some components of the state vector, then the states degrade and the gradient vanishes. If $i>0$, the states can be unstable and the gradient can explode. Training a LSTM is difficult as described previously. Truncated gradients, capped gradients, and regularizers that control the loop gains have been used to make LSTMs (and GRUs as well) work better.

1.2 GRUs

Figure 3:
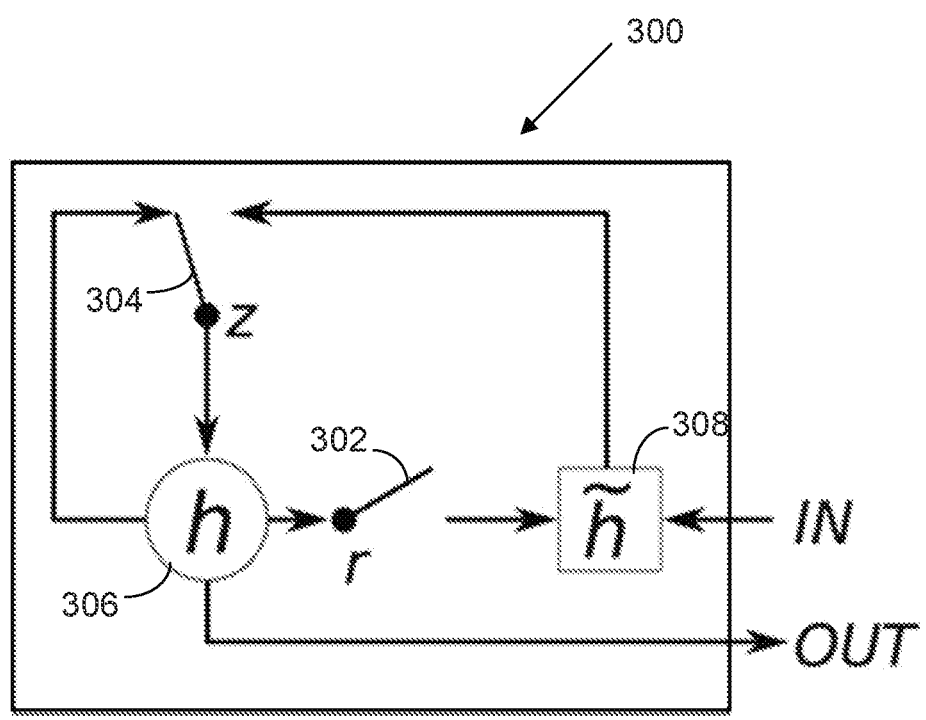
FIG. 3 is a diagram illustrating a simplified version of a Gate Recurrent Unit (GRU) system.
Figure 4:
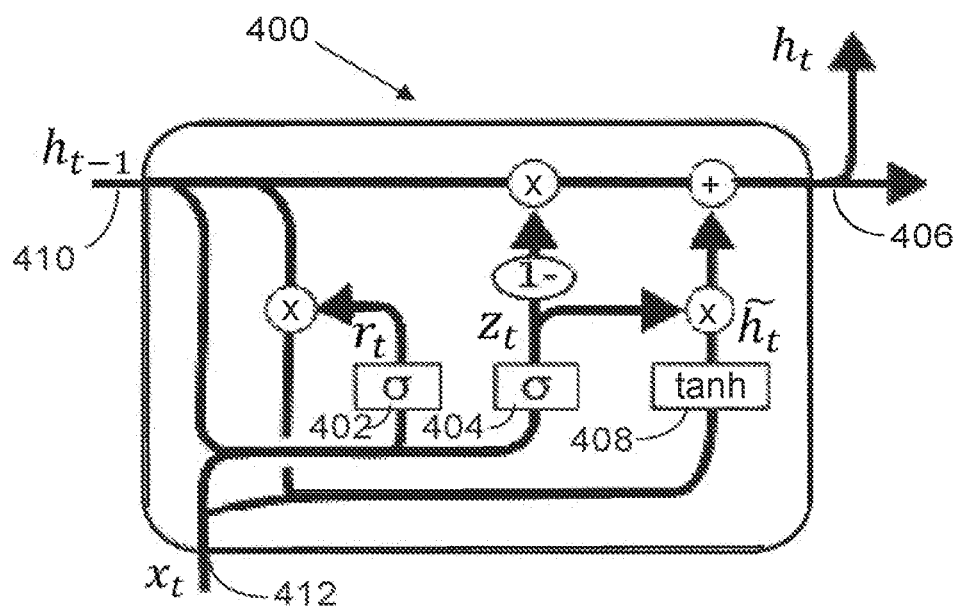
FIG. 4 is a diagram illustrating one implementation of the GRU of FIG. 3, which better highlights the dependencies.

GRUs are simpler than LSTMs in the sense that they have less gates, but are not fundamentally different. A simplified version of a GRU 300 is depicted in FIG. 3, where r 302 and z 304 are gating functions; h 306 represents a stored state; and $\tilde{h}$ 308 is a function that computes the incremental change in the stored state for the current time period t. An example GRU 400 that better highlights its dependencies is depicted in FIG. 4. The equations that drive a GRU are given below:

$$z_t = \sigma(W_z \cdot [h_{t-1}, x_t] + b_z) \quad (12)$$

$$r_t = \sigma(W_r \cdot [h_{t-1}, x_t] + b_r) \quad (13)$$

$$\tilde{h}_t = \tanh(W_h \cdot [r_t * h_{t-1}, x_t] + b_h) \quad (14)$$

$$h_t = (1 - z_t) * h_{t-1} + z_t * \tilde{h}_t \quad (15)$$

The GRU 400 has two gate functions, a reset gate function r 402 and an update gate function z 404. It also has inputs representing the previous output $h_{t-1}$ 410 and the current input $x_t$ 412. The state loop, which computes the new $h_t$ 406 from the previous $h_t$ and $\tilde{h}_t$ 408, is implemented through the gate functions r 402 (reset) and z 404 (update). When z=1, the loop on the left has eigenvalues of 1. However, like the LSTM, if z<1, the states degrade with time and the gradients vanish. Also the contribution from $\tilde{h}_t$ 408 can make the gradient explode.

Both LSTM and GRU neural networks address the conflict between state stability and vanishing gradient by keeping the state loop gain very close to 1 using gating units (logistic units that saturate at 1) and by altering the truthful gradients. However, both LSTMs and GRUs are inherently difficult to tune and control because of the conflict between stability and long term learning. For example, the storing loop is deeply embedded in a complex non-linear trainable function, which makes it hard to analyze and control.

Further, in LSTMs and GRUs, the "forgetting" is done at the unit level. It is not possible to forget distributed representation. For instance, if the concept of royalty and gender were distributed across multiple units in a word2vec kind of representation, it would be difficult for LSTM and GRU architecture to forget the royalty concept while preserving the gender or vice versa. The representations for royalty and gender would either have to be attached to independent units or would have to be forgotten together.

Finally, LSTM and GRU are quite complex and have multiple non-linearities which make learning simple linear functions difficult.

2.0 Differential Recurrent Neural Network (RNN)

Differential RNN implementations described herein circumvent the conflict between stability and slow training. More particularly, differential RNN implementations described herein have several advantages. For example, their states are stable and the gradients are preserved indefinitely. In addition, the states are updated by addition rather than gating. This allows for selective distributed forgetting. Still further, the state transition function is efficiently trainable. It is also possible to regularize the state complexity (minimize state transitions), and to regularize the system toward a system of linear differential equation.

Figure 5:
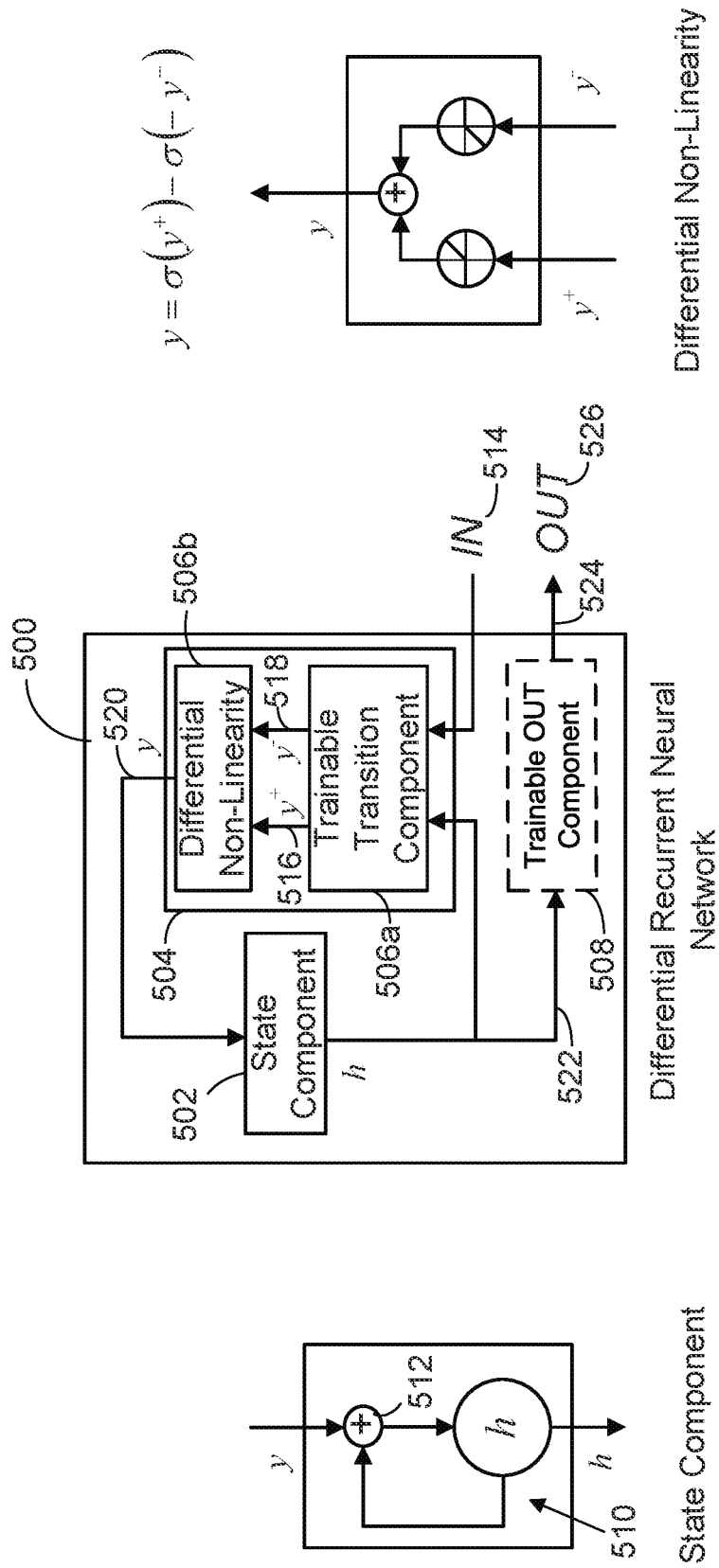
FIG. 5 is a diagram illustrating one implementation of an architecture for a differential RNN.

One implementation of a differential RNN is illustrated in the architecture shown in FIG. 5. The differential RNN 500 (which can also be referred to as a "Differential Recurrent Unit" (DRU)) in the center of FIG. 5 is made of 4 components: a state component subprogram 502, a trainable transition and differential non-linearity component sub-program 504 that includes a neural network, and, optionally, a trainable OUT component sub-program 508 which also includes a neural network (shown as a broken line box to indicate its optional nature). All the dependencies are shown in the figure, i.e., the trainable transition component only depends on h and IN and the trainable OUT component only depends on h. It is noted that in one implementation, the trainable transition and differential non-linearity component sub-program 504, it can be thought of as having two parts—namely a trainable transition component 506a that includes the neural network and a differential non-linearity component 506b.

The state component sub-program 502 stores states. This state component sub-program 502 includes a state loop 510 with an adder 512 for each state, as shown in the expanded version of a storage loop of the state component sub-program 502 shown in FIG. 5. For each state being stored, the state component sub-program 502 modifies and stores a current state by adding the previous stored state to a corresponding element of a state contribution vector output by a differential non-linearity component sub-program 504 using the associated state loop 510 and adder 512 each time an input vector is input into the differential RNN 500.

The differential RNN 500 also includes the aforementioned trainable transition and differential non-linearity component sub-program 504 that includes the aforementioned neural network. In one implementation, this neural network is regularized to a linear function. The trainable transition and differential non-linearity component sub-program 504 takes as an input, an output of the previous stored states from the state component sub-program 502 along with an input vector 514, whenever an input vector is entered into the differential RNN 500. The trainable transition and differential non-linearity component sub-program 504 then produces a positive contribution vector 516 and a negative contribution vector 518 whose elements each correspond to a different element of the states being stored in the state component sub-program 502. The foregoing can be thought of in one implementation as being accomplished by the trainable transition component 506a. The positive contribution vector 516 and a negative contribution vector 518 are then employed to produce and output the state contribution vector 520 that is input into the state component sub-program 502. These latter tasks can be thought of in one implementation as being accomplished by the differential non-linearity component 506b, which is shown in an expanded version on the right in FIG. 5.

Each element of the state contribution vector 520 is computed as the difference of a function of a positive contribution value for a corresponding element in the positive contribution vector and the function of a negative contribution value for the corresponding element in the negative contribution vector. This function is such that whenever the positive contribution vector 516 equals the negative contribution vector 518, the state contribution vector 520 represents the identity matrix. In addition, the function is such that whenever the positive contribution value for an element in the positive contribution vector is less than or equal to 0 and the negative contribution value for the corresponding element in the negative contribution vector is greater than or equal to 0, the corresponding state contribution vector element is 0.

In one implementation, the differential RNN 500 further includes a trainable OUT component sub-program 508 which includes a neural network. In one version, this neural network is regularized to a linear function. The trainable OUT component sub-program 508 takes as input the aforementioned current states output 522 from the state component sub-program 502. It then performs post-processing on these current states to produce a set of post-processed states 524. The post-processed states 524 are output from an output 526 of the differential RNN. In an alternate implementation, the differential RNN 500 does not have the aforementioned trainable OUT component sub-program and the current states are output from the state component sub-program 502 directly to the output 526.

In one implementation, the differential RNN operates on one or more computing devices. These computing devices are in communication with each other via a computer network whenever there is a plurality of computing devices. In addition, the differential RNN includes a computer program having a plurality of sub-programs executed by the computing devices. In another implementation, the differential RNN operates on a computing device and a computer program having a plurality of sub-programs is executed by the computing device.

The foregoing component sub-programs making up the differential RNN will now be described in more detail in the following sections.

2.1 State Component

The purpose of the state component is to store states. It is implemented with a simple recurrent loop and an adder. It is not trainable. The Jacobian of the state component is the identity so its eigenvalues are all 1. The gradients coming from the components that consume $h^t$ accumulate at every time step and are preserved indefinitely in this loop. They are passed down to the component that generates input $y^t$ at every time step. The states of the state component can be modified by adding or subtracting to the states via input $y^t$. If $y^t=0$, the states are preserved at that time step. This component exhibits the aforementioned advantageous stable states and indefinitely preserved gradients. In addition, the states are updated by addition rather than gating.

2.2 Differential Non-Linearity Component

The function of the differential non-linearity component (which in one implementation is an integral part of the trainable transition and differential non-linearity component sub-program) is to receive the positive and negative contributions as two different inputs, $y^+$ and $y^-$, and to output the state contribution vector. In one implementation, the component's computation is completely summarized by the equations:

$$y=\sigma(y^+)-\sigma(-y^-) \tag{16}$$

$$\sigma(x)=\max(0,x) \tag{17}$$

While in one implementation this component is integrated in the trainable transition and differential non-linearity component sub-program, there is an advantage to separating the trainable transition component from the differential non-linearity component. The simple break down of positive and negative contributions brings clarity and enables functionality (adding curvature, regularizing) without modifying the architecture of a separate trainable transition component. Doing this can enable the use of an off-the-shelf neural network for the separate trainable transition component.

It is noted that the symbols ⊕ ⊖ shown in the expanded version of differential non-linearity component 506b in FIG. 5 refer to $\delta(y+)$ and $-\delta(-y^-)$, respectively, which in turn respectively correspond to $\max(0, y^+)$ and $-\max(0,-y^-)$.

It is further noted that the foregoing differential non-linearity equations exhibit certain desirable properties. For example, if $y^+=y^-$, then y corresponds to the identity matrix. In addition, the component can output $y=0$ in a stable (robust to noise) configuration if $y^+\leq 0$ and $y^-\geq 0$. This capability allows the preservation of the states indefinitely. Give this, the differential non-linearity equations could be other than those described above.

2.2.1 Curvature

If it is assumed that the non-linearity of the differential component (either as part of the trainable transition and differential non-linearity component sub-program or as a separate differential non-linearity component sub-program) is defined by:

$$\sigma(x)=\max(0,x), \tag{18}$$

there is a concern that during training $\sigma(y^+)$ and $\sigma(-y^-)$ may be 0 for all inputs and thus the system is stuck on a plateau with no chance of escaping. To escape this condition, in one implementation, a bit of curvature can be added to the Hessian by approximating $\sigma$ by a smoothed version during back-propagation. This is done by convolving $\sigma$ with the function $h_a$:

$$\sigma_a=\sigma * h_a \tag{19}$$

Where $h_a$ is the derivative of the sigmoid function, or $$h_a(x) = \int_{-\infty}^{x} \frac{1}{1+e^{-a\tau}} d\tau = \frac{ae^{ax}}{(1+e^{ax})^2} \tag{20}$$

Figure 6:
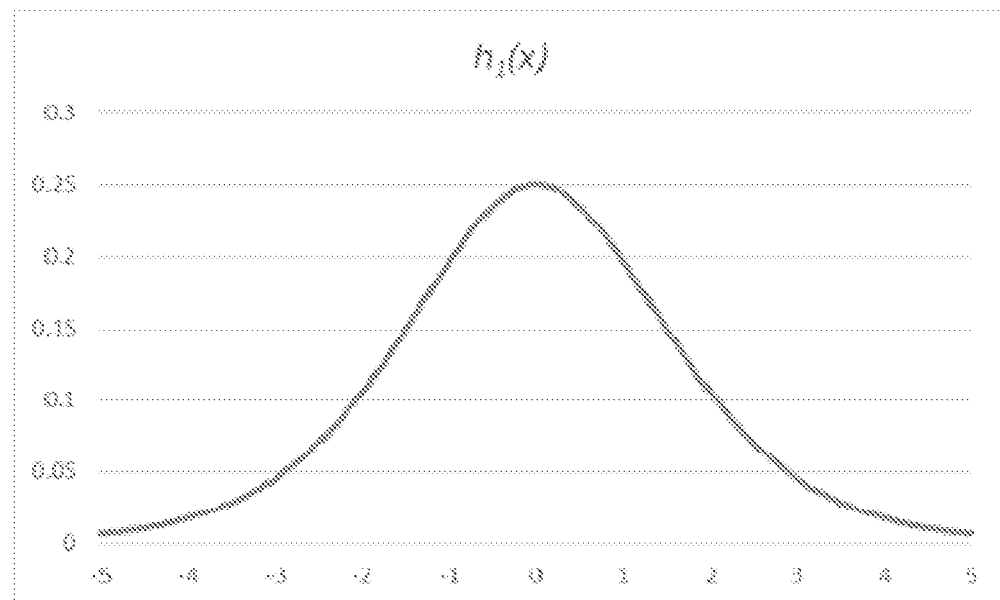
FIG. 6 is a graph of the derivative of the sigmoid function $h_a$ for a=1.
Figure 7:
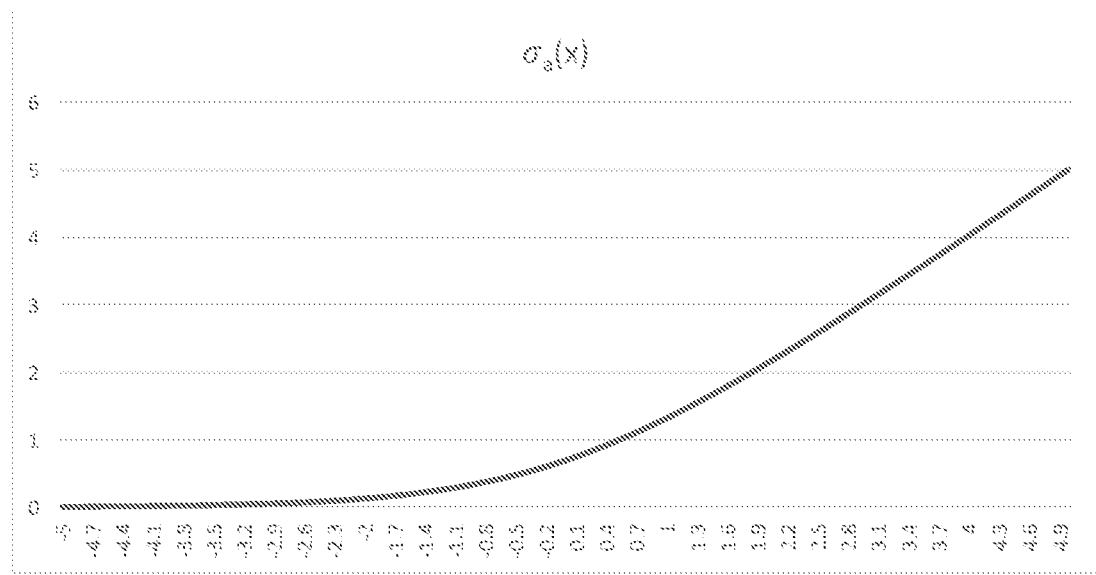
FIG. 7 is a graph of aa which is the convolution of a with the function $h_a$ for a=1.

The function $h_a$ and $\sigma_a$ are depicted in FIGS. 6 and 7 for a=1.

It is easy to verify that $h_a$ is infinitely differentiable, strictly positive, symmetric around 0, integrates to 1, and is very close in shape to a Gaussian centered on 0.

Furthermore it can be shown that $\sigma_a$ is the softplus function $$\sigma_a(x) = \frac{1}{a}\log(1+e^{ax}) \tag{21}$$

and that it tends toward σ when a tends toward infinity $$\lim_{a \to \infty} \sigma_a = \sigma \quad (22)$$

By definition of $\sigma_a$, the gradient of σ can be approximated by:

$$\frac{\partial \sigma(x)}{\partial x} \approx \frac{\partial \sigma_a(x)}{\partial x} = \frac{1}{1 + e^{-ax}} \quad (23)$$

It is known from experience that using the gradient of a smoother version of a flat-by-part activation function adds curvature to the Hessian without adversarial effects on the convergence of the stochastic gradient descent (SGD). The reason is that the stochastic process in SGD and the convolution with $h_a$ both have blurring effects on the gradients, but the blurring effect of SGD is typically far larger than any smoothing of the activation function effect. At the smoothing extreme, the gradient goes through unaltered:

$$\lim_{a \to 0} \frac{\partial \sigma_a(x)}{\partial x} = 1 \quad (24)$$

It will now be proved that:

$$\sigma_a(x) = \frac{1}{a}\log\left(1 + e^{ax}\right) \quad (25)$$

By definition of the convolution of $h_a$ and σ, where τ indexes the pattern presentations:

$$(\sigma * h_a)(\tau) = \int_{-\infty}^{+\infty} \sigma(\tau - x) h_a(x) dx \quad (26)$$

$$= \int_{-\infty}^{+\infty} \max(\tau - x, 0) h_a(x) dx \quad (27)$$

$$= \int_{-\infty}^{\tau} (\tau - x) h_a(x) dx \quad (28)$$

Since:

$$\tau - x \geq 0 \Leftrightarrow x \leq \tau \quad (29)$$

If integrated by part using:

$$h_a(x) = \frac{ae^{ax}}{(1 + e^{ax})^2} = \frac{\partial\left(\frac{1}{1 + e^{-ax}}\right)}{\partial x} \quad (30)$$

The result is:

$$\int_{-\infty}^{\tau} (\tau - x)\frac{\partial\left(\frac{1}{1 + e^{-ax}}\right)}{\partial x} dx = \left[\frac{\tau - x}{1 + e^{-ax}}\right]_{x=-\infty}^{x=\tau} - \int_{-\infty}^{\tau} -\frac{1}{1 + e^{-ax}} dx \quad (31)$$

$$= \left[\frac{\tau - x}{1 + e^{-ax}}\right]_{x=-\infty}^{x=\tau} + \left[\frac{1}{a}\log(1 + e^{ax})\right]_{-\infty}^{\tau} \quad (32)$$

$$= \frac{1}{a}\log(1 + e^{a\tau}) \quad (33)$$

And finally:

$$(\sigma * h_a)(\tau) = \frac{1}{a}\log(1 + e^{a\tau}) \quad (34)$$

It is then proved that:

$$\lim_{a \to \infty} \sigma_a = \sigma \quad (35)$$

This results from:

$$\lim_{a \to \infty}\left(\frac{1}{a}\log(1 + e^{ax})\right) = \begin{vmatrix} \lim_{a \to \infty} \frac{ax}{a} & \text{if } x > 0 \\ 0 & \text{otherwise} \end{vmatrix} = \max(x, 0) = \sigma(x) \quad (36)$$

2.2.2 Regularization

The differential non-linearity component (either as part of the trainable transition and differential non-linearity component sub-program or as a separate differential non-linearity component sub-program) can also enable the introduction of a transition regularizer during training. In one implementation, this is done by minimizing either:

$$r_T y^2; \quad (37)$$

or $$r_T((y^+ + b)^2 + (y^- - b)^2). \quad (38)$$

The first regularizer brings y close to 0 at a linear rate of convergence. Once the gradient update from the regularizer overshoots (an artefact of the learning rate) and makes $y^+ < 0$ and $y^- > 0$, the states are left undisturbed. The second regularizer is a bit more aggressive with a linear convergence rate to b but a superlinear rate of convergence toward $y^+ < 0$ and $y^- > 0$. It also makes the states more stable to noise smaller than b.

The strength of the regularizer $r_T$ expresses the strength of the prior that the target function minimizes the state transitions while fitting the data. Without this prior, the system's state representations could be complex and meaningless orbits with unpredictable generalization. The regularizer acts on the output of the differential component y, not directly on its weighs. The weighs can have large values and implement aggressive transitions some of the time as required by the data. But in the absence of signal and despite the presence of uncorrelated noise, the regularizer will push the system toward a zero differential.

2.3 Trainable Transition Component

The trainable transition component (either as part of the trainable transition and differential non-linearity component sub-program or as a separate trainable transition component sub-program) can be implemented by a neural network with two outputs connected to a last linear layer. The neural network needs at least 2 layers to be able to implement arbitrarily complex state transition functions (assuming enough hidden units). A powerful transition component allows complex state transition to happen instantaneously without requiring multiple iterations involving the state component. A regularizer on transitions helps moving the transition computation out of the state loop. One neural network that provides these features is a Mirror Deep Neural Network (DNN) which regularizes to a linear function. The Mirror DNN is described in a U.S. patent application entitled "Mirror Deep Neural Networks That Regularize To Linear Networks" having Ser. No. 15/359,924 which was filed on Nov. 23, 2016.

2.4 Trainable OUT Component

The trainable OUT component is an optional component (as indicated by the dashed line box in FIG. 5) that is trainable and which allows complex post-processing of the states to be carried out outside the state loop. While any off-the-shelf neural network can be used for this component as well, a Mirror DNN which regularizes to a linear function would be a good choice.

3.0 Transition Loop Analysis And Additional Features

The foregoing transition loop formed by the state component and the trainable transition and differential non-linearity component (or the state component, differential non-linearity component and the trainable transition component if the latter two components are separate entities) is stable and can learn long term dependencies. This can be seen by comparing the differential RNN and a residual DNN.

To simplify notations, the function computed by the trainable transition and differential non-linearity component can be combined into one function $F(W, h^t, i^t)$ which takes as input the trainable parameter W, the output of the state component $h^t$ and the input $i^t$. Advantageously, F could be implemented with a Mirror DNN initialized and regularized to compute a linear function. When F is linear in its input, the system can emulate arbitrary linear differential equations governed by:

$$h^{t+1} = h^t + F(W, h^t, i^t) \quad (39)$$

Or in continuous form:

$$\frac{\partial h(t)}{\partial t} \approx W_h h(t) + W_i i(t) \quad (40)$$

When data requires it, the Mirror DNN can detect non-linear transitions and emulate more complex non-linear functions.

Figure 8:
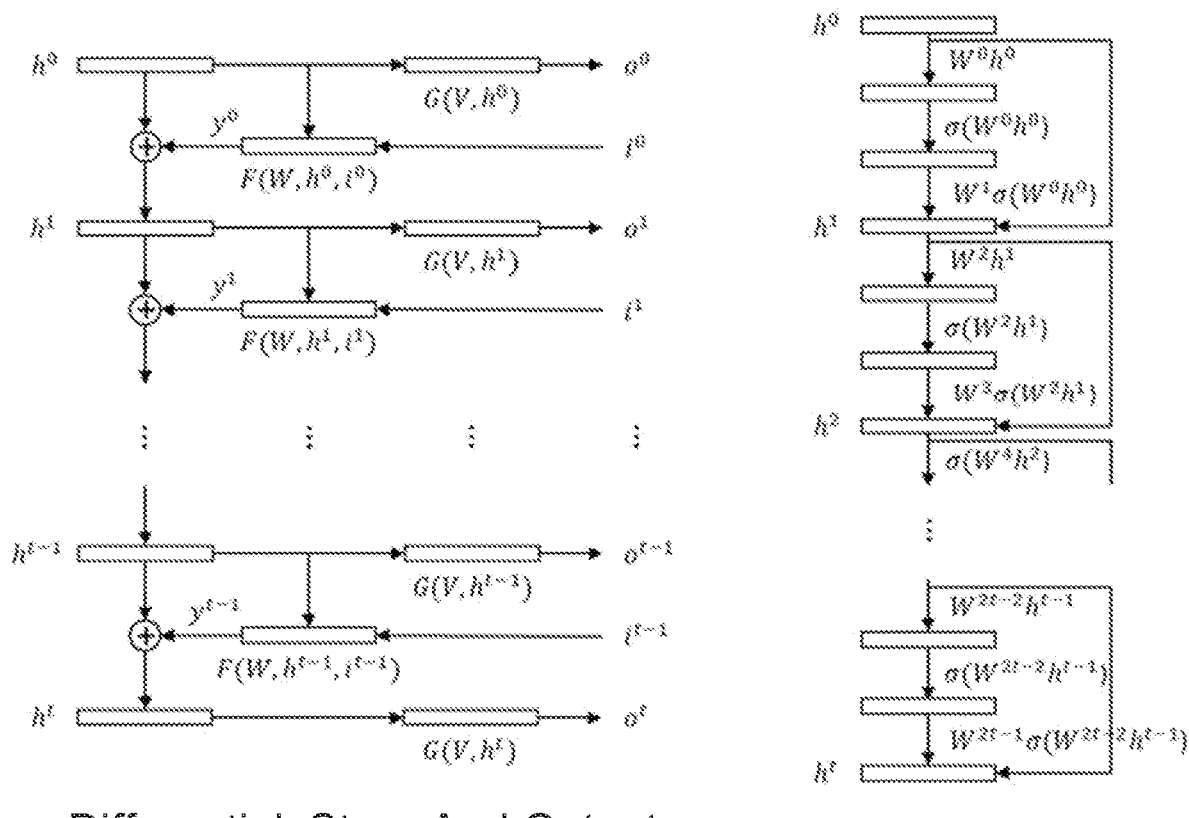
FIG. 8 is a diagram illustrating the computational flow of the differential, store and output components of the differential RNN on the left, and the computational flow of a deep residual neural network (residual DNN) on the right, both unfolded in time.

The intuition that the transition loop is stable and can learn long term dependencies, comes from the parallel between the differential RNN and the residual DNNs architecture. The state component and the differential non-linearity component (either as part of the trainable transition and differential non-linearity component sub-program or as a separate differential non-linearity component sub-program) have the same relationship. The "differential component" is computing a "residual" which is added to the Identity (computed by the state store). The relationship between the two architectures is illustrated in FIG. 8, where time is unfolded. The differential, store and output components of the differential RNN are shown on the left, and the residual DNN is shown on the right.

If the transition function F implements the basic element of the residual DNN as follows, $$F(W, h^t, i^t) = W^{2t+1} \sigma(W^{2t} h^t) \quad (41)$$

$$W^t = W^{t-2} \quad (42)$$

$$i^t = 0 \quad (43)$$

$$h^0 = \text{input} \quad (44)$$

then the differential RNN and the residual DNN are computing the same function. Note that F can compute the residual component function even though its last layer is the differential non-linearity component because this component becomes a no-op if $y^+ = y^-$. The remarkable property common to both architectures regardless of what F computes is that their default behavior is to propagate information unaltered forward (states) and backward (gradients) through the identity connection.

The residual DNN architecture has proven very effective to train very deep networks with over 1000 layers, partly because the Hessian of the objective function is well conditioned when the residual is small. It can be expected that the same behavior can be seen from differential RNNs for the same reason if a transition regularizer keeps the differential signal small.

The two architectures have one difference: In the differential RNN (as is typical for RNNs in general), the weights are shared in time. This introduces two complications during training. First, the expansion or contraction of the mapping computed by a layer is the same for all layers and its effect is compounded across a large number of layers (i.e. vanishing or exploding gradients). In residual nets, the expansion and contraction of the various layers can cancel each other making compounding effects less dramatic. RNNs also have an unbounded number of layers. Secondly, a gradient introduced at layer t is affecting each weight t times. This impacts the conditioning of the Hessian by introducing curvature variations. Short sequences have less impacts on the weights (smaller Hessian eigenvalues) than long sequences (higher Hessian eigenvalues). In residual nets, all sequences have the same lengths so the Hessian is better conditioned.

It is noted that F cannot be regularized to be linear and to output 0 at the same time. If F is a Mirror DNN regularized to be linear with regularizer $r_L$ and the differential non-linearity component is regularized toward output 0 using regularizer $r_T$, the regularization toward 0 will win. This is good because both F and G can be regularized toward being linear function without worries: the last layer of F will regularize to minimize the number of transitions and thus conferring stability to the whole system.

This resolution of the foregoing regularizer conflict can be proved as follows. Consider the following two regularizers:

$$r_t \tfrac{1}{2}((y^+ + b)^2 + (y^- - b)^2) \quad (45)$$

$$r_i \tfrac{1}{2}(y^+ - y^-)^2 \quad (46)$$

The first regularizer is controlled by $r_t$ and is used to minimize the number of state transitions generated by the differential non-linearity component (either as part of the trainable transition and differential non-linearity component sub-program or as a separate differential non-linearity component sub-program). The second regularizer is used to make the function computed by the same component close to the identity. Clearly these regularizers are in conflict. However, in the absence of data and if $r_t \neq 0$, $r_t$ always win. More particularly, in the absence of data:

$$E(y^+, y^-) = r_t((y^+ + b)^2 + (y^- - b)^2) + r_i(y^+ - y^-)^2 \quad (47)$$

If the gradient is followed to its minimum:

$$\frac{\partial E(y^+, y^-)}{\partial y^+} = r_t(y^+ + b) + r_i(y^+ - y^-) = 0 \quad (48)$$

$$\frac{\partial E(y^+, y^-)}{\partial y^-} = r_t(y^- - b) - r_i(y^+ - y^-) = 0 \quad (49)$$

This gives a system in $y^+$ and $y^-$:

$$+(r_t+r_i)y^+ - r_i y^- + r_t b = 0 \quad (50)$$

$$-r_i y^+ + (r_t+r_i)y^- + r_t b = 0 \quad (51)$$

If $r_t=0$, the system is under constrained and the solution is $y^+=y^-$. If $r_t \neq 0$, the system has a solution:

$$y^+ = \frac{-r_t b}{r_t + 2r_i} \quad (52)$$

$$y^- = \frac{r_t b}{r_t + 2r_i} \quad (53)$$

In other words, $y^+ \leq 0$ and $y^- \geq 0$. The differential non-linearity component (either as part of the trainable transition and differential non-linearity component sub-program or as a separate differential non-linearity component sub-program) outputs 0, so $r_t$ wins. This means that the linearity regularizer in the Mirror DNN will bow to a differential non-linearity regularizer which minimizes the state transitions.

3.1 Gradient Blocker

As indicated previously, there is a conflict between stability and long dependency training. This conflict is considerably lessened in the case of differential RNNs because the state store which is untrainable and the trainable component which does not store states have been decoupled. The state component's stability is guaranteed by having the eigenvalue of its Jacobian architecturally clamped to exactly 1 (instability is defined as >1). Going backward, the gradient does not vanish while going back in time in the store because the eigenvalues of the transpose are also exactly equal to 1. Since the state component has no trainable parameter its Jacobian is constant in time. This is a departure from LSTMs and GRUs which have a loop with a gain that is a function of learning. If the $f$ and $i$ gates are in transition and have a less than 1 gain in the LSTM element, the gradient will vanish after a few time steps. If the signal only exists in long term dependencies, the LSTM is in trouble and could take a very long time to recover. The same is true for GRU if the gates z deviates from 0 and r deviates from 1.

In differential RNNs, the gradients in the state component loop never vanish or explode. They remain constant. However, an astute reader will object that while the state loop may be stable on its own, it is impacted by the differential loop which is both trainable and likely to inject instabilities and create vanishing or exploding gradients. Fortunately, the clean separation of the two loops provides powerful means to alleviate and even refute this objection. State information can be stored in either the state loop or the differential loop. Storing information in both is not needed. Indeed, storing states in the differential loop is not desired.

Figure 9:
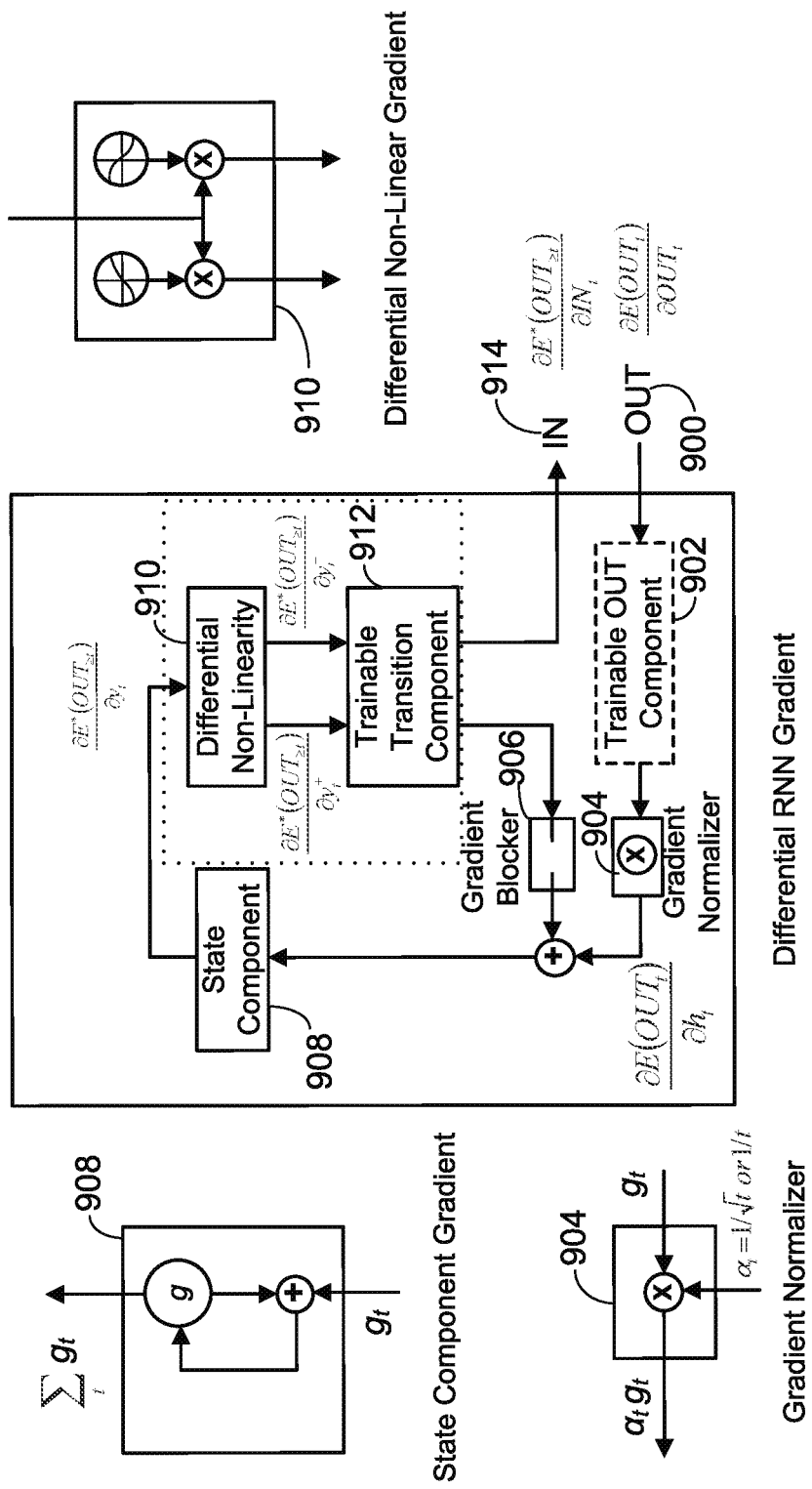
FIG. 9 is a diagram illustrating a backpropgation flow for training the differential RNN architecture of FIG. 5.

The transition regularizer $r_T$ was introduced to bring the output of the transition component to 0. This prior erases spurious information from the differential loop. Additionally, keeping a separation between the state loop and differential loop can be furthered in one implementation by putting an additional feature referred to as a gradient blocker in the differential loop. FIG. 9 illustrates the differential RNN architecture with a gradient blocker in the recurrent loop. It is noted that in FIG. 9, while the trainable transition component 912 and differential non-linearity component 910 are shown as separate entities, they could also be combined in one implementation into an integrated trainable transition and differential non-linearity component (as indicated by the dotted line box). For convenience in the following discussion of the gradient blocker, and later in the discussion of training a differential RNN, the trainable transition component 912 and differential non-linearity component 910 will be referred to as if they were separate entities. However, these discussions could apply to an implementation having an integrated trainable transition and differential non-linearity component as well. The gradient blocker component 906 allows the output of states h from the state component sub-program to be input into a trainable transition component 912 along with an input vector whenever an input is entered into the differential RNN during the forward propagation (as described earlier in connect with FIG. 5), but prevents a backpropagation signal from the trainable transition component generated during training of the differential RNN from being used by the state component. In other words, the signal goes through in the forward pass, but the gradient signal in the other direction is blocked. Clearly this removes any concern of vanishing or exploding gradients through the differential loop. The differential loop has no gradient circulating through it. It still can learn at every step because gradient is introduced by the state component (which does have circulating gradient inside its state loop). The effect of the gradient blocker and the regularizer, is to limit the transition component to react only the last state and input.

Learning long term dependencies is possible because the gradient of an error is preserved indefinitely in the state component and injected at every time step. The gradient will be available to affect the transition component for the correct input, no matter how far back in the past it occurred. This is done without compromising stability because the state component is static (non-trainable) and stable.

It should be noted here that the gradient blocker represents one of two times the true gradient can be altered. As indicated previously, in one implementation, the differential non-linearity component is computing $\sigma(x)=\max(0,x)$ going forward, but using $\sigma_a = \sigma * h_a$ going backward. This also alters the gradient, but allows it to reach the trainable transition component, even when $y'=0$ and is totally stable. It is believed that both alterations of the gradient can be beneficial to the conditioning of the Hessian and do not interfere with the quality of the solution that the system will converge to.

3.2 Normalizer

The combination of sharing weight in time and the state component duplicating gradient indefinitely is worrisome once it is realized that sequences may vary widely in length. Consider a case where a training set contains the following two sequences:

Sequence A: length 10, with a target output at $o^{10}$ and no other targets. Let's assume that after backpropagation through G(V,x), it generates a unique gradient $g_A^{10}$ at t=10;

Sequence B: length 1,000, with a target output at $o^{1,000}$ and no other targets. Let's assume that after backpropagation through G(V,x), it generates a unique gradient $g_B^{1,000}$ at t=1000.

The state loop will duplicate $g_A^{10}$ ten times and $g_B^{1,000}$ a thousand times and feed each of these gradients to the backward propagation of (W, h',i'). Clearly, this induces a wide range of curvatures in the Hessian with respect to W. The sequence B will learn faster than the sequence A (the variation of gradient in time for training A and the variations of gradient in time for training B are a proxy for curvature (or eigenvalue) ratios). A residual network does not have this problem because the number of layers is fixed for all patterns.

Sequences of equal lengths and similar gradient will induce similar curvatures, but sequence of different lengths can create variable curvatures, which can slow down the learning considerably because the maximum learning rate will be determined by the longest sequences. Assuming gradients of short lengths and gradients of long length are not correlated, the standard deviation of the gradient's norm scales with the square root of the sequence length.

To correct for the curvature ratios induced by variation of sequence length, in one implementation an additional feature referred to as a length normalizer is added to the state component. Decaying the gradient is a bad idea. It would favor short term dependencies over long term dependencies and would make very long term dependencies nearly impossible to learn. A better solution is to give equal gradients to all time steps, but to scale the gradients inversely proportionally to the length or the square root of the length.

The problem originates from the infinite copying of the gradient in the adder going backward. Additionally, going forward induces a copy of the gradients going backward (and vice versa: copying an activation going forward means gradients are added going backward). This means that an adder in time ends up injecting the same gradient indefinitely to the same (shared in time) weights. This immediately raises a suspicion of large eigenvalue ratio for the Hessian, and a hard to optimize problem, as pointed out earlier. The standard deviation of gradients grows with the square of the length of the time stamp they were generated from. Since the duplication of the gradients comes from the adder, it bears further consideration. Consider FIG. 10, where a full unfolded depiction of differential RNN is seen on the left, and an equivalent computation of the adder is shown on the right, except it is depicted as independent computations from y instead of recursive computations. The only gradients that go through W comes from the state component or h.

Figure 10:
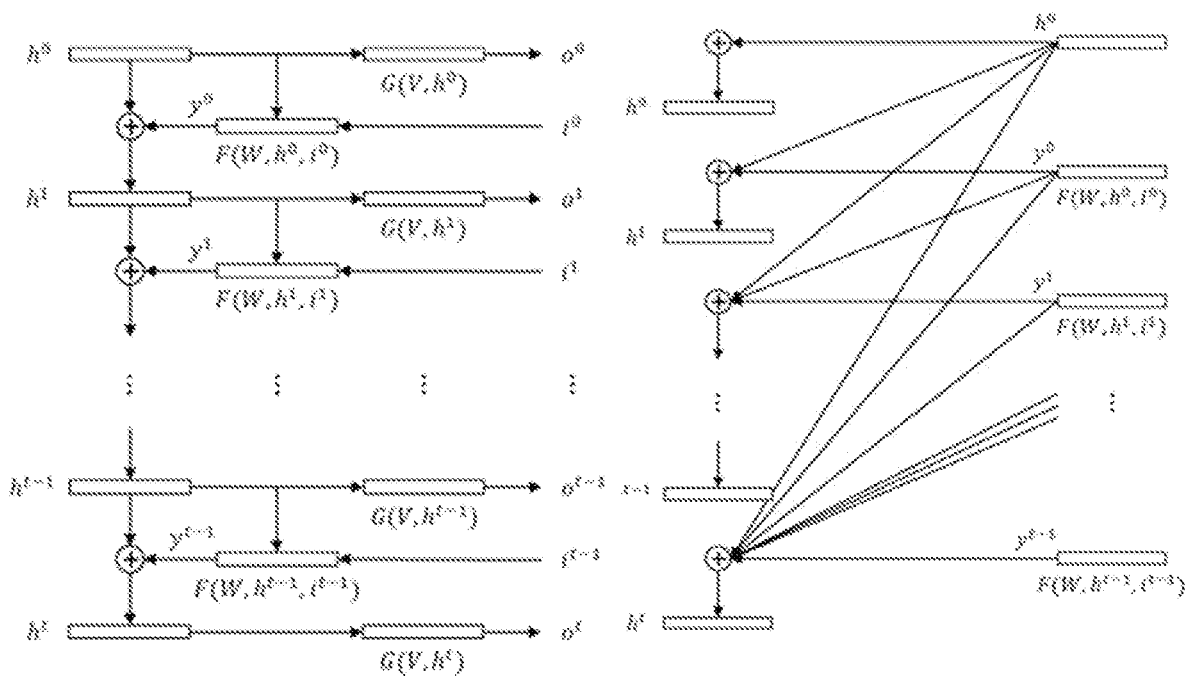
FIG. 10 is a diagram illustrating the computational flow of the differential, store and output components of the differential RNN on the left, and the equivalent computational flow of an adder of the state component on the right, both unfolded in time, where the computational flow of the state component adder removes the recursive aspect of the computation.
Figure 11A:
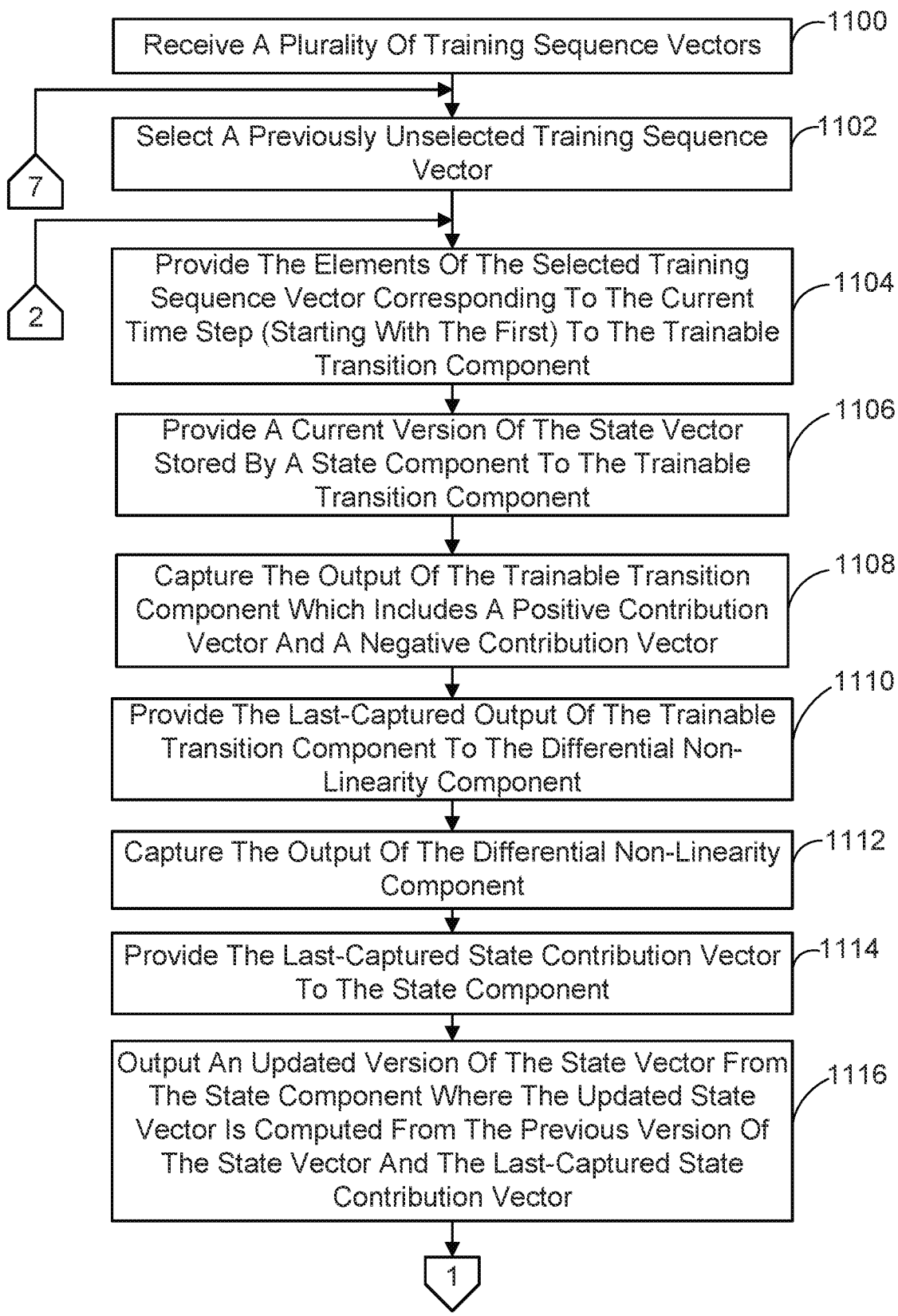
FIGS. 11A-E present a flow diagram illustrating an exemplary implementation, in simplified form, of sub-program actions for training a differential RNN.
Figure 11B:
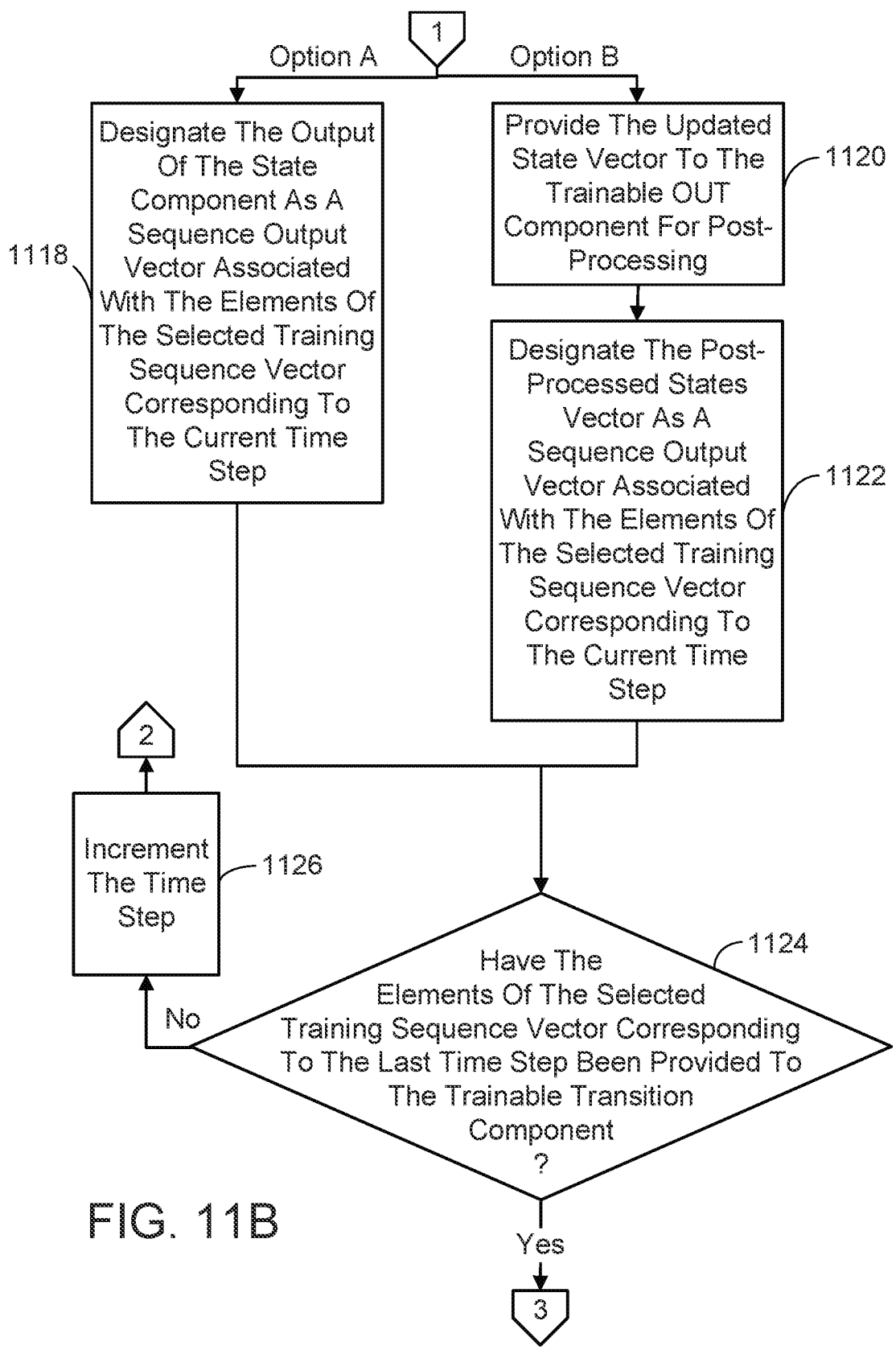
Figure 11C:
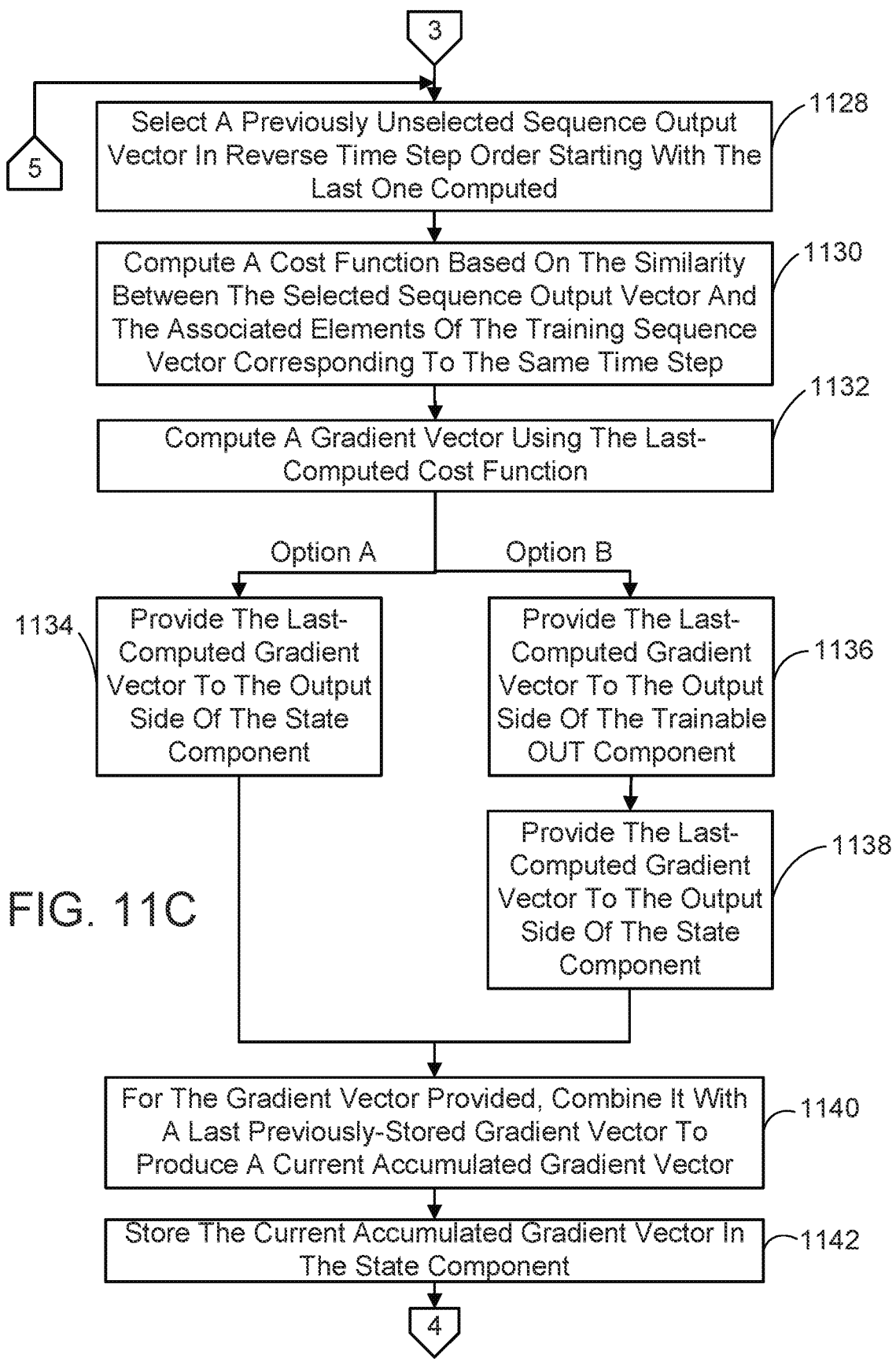
Figure 11D:
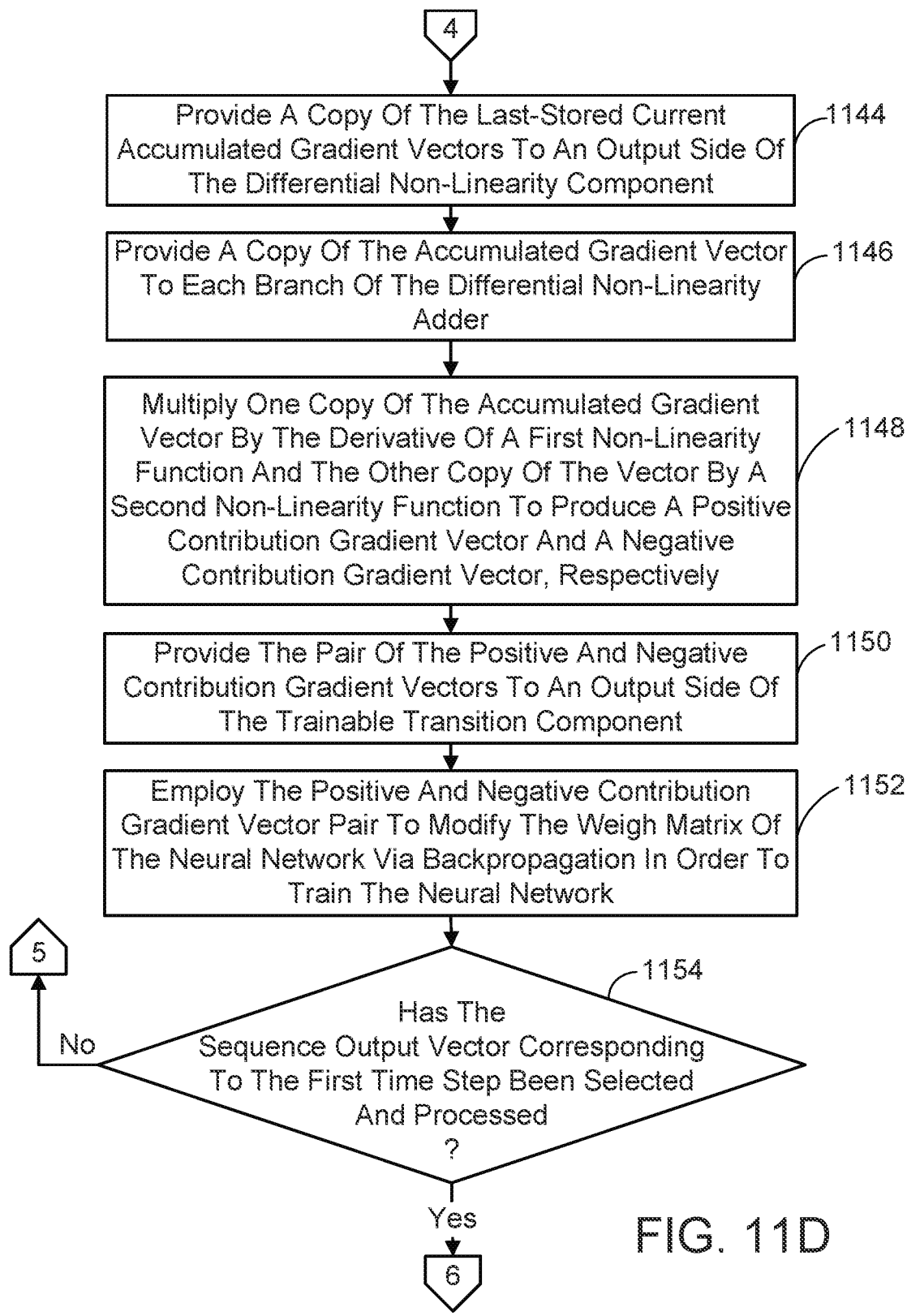
Figure 11E:
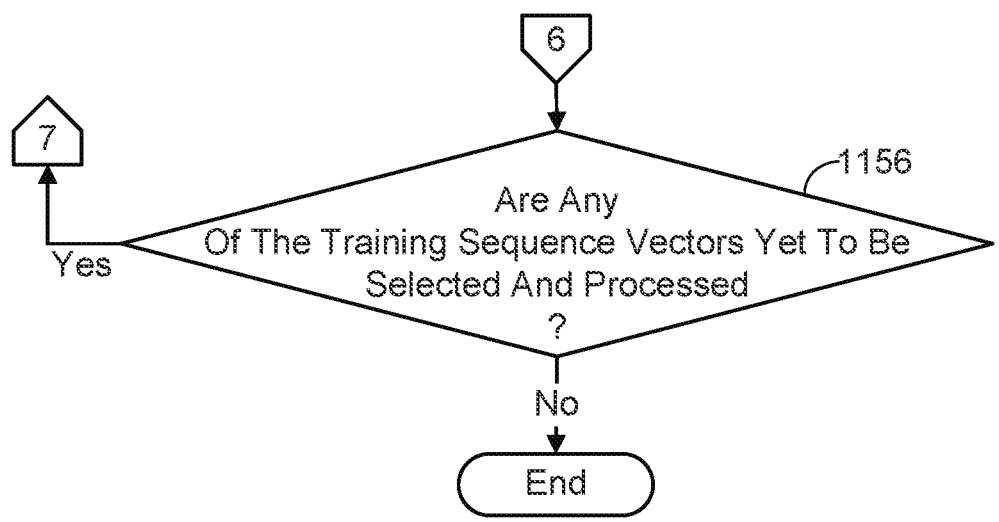

In FIG. 10, the left and right diagrams compute exactly the same function for $h^t$, but the right diagram removes the recursive aspect of the adder computation. The right diagram gives the intuition that each $h^t$ is independently computed by variable sum of variables which all depend on the same W. From this picture, it is easy to conceptualize normalizing the gradient by a function of the fanin of the sum. The fanin of the sum is given by time stamp t. For each $h^t$, the gradient can be divided by t (assuming linear correlation) or by $\sqrt{t}$ (assuming no correlation) to normalize the effect of a gradient introduced at time t. The diagram helps visualize this normalization as a "hardware" normalization. Alternatively, one could assume a weighted error by $$\frac{1}{t} \text{ or } \frac{1}{\sqrt{t}}$$

for the output $o^t$ to achieve the same effect. In one implementation, this can be implemented recursively in the differential RNN's state component by inserting a gradient normalizer, as illustrated in FIG. 9. As seen in FIG. 9, the signals (forward or backward) can only flow in one direction. In the backward direction, the gradient $g_t$ is divided by $\sqrt{t}$ (although if a linear correlation is assumed, $g_t$ is divided by t instead). It is easy to show that this is the recursive implementation of the division of the gradient by $\sqrt{\text{fanin}}$ in the unfolded diagram. The purpose of this normalization is to improve the conditioning of the Hessian when input gradients are injected from sequences having variable length.

4.0 Training a Differential RNN

The differential RNN computes a function of time given by:

$$h^{t+1}=h^t+F(W,h^t,i^t) \tag{54}$$

$$o^{t+1}=G(V,h^{t+1}) \tag{55}$$

Where $h^0$ is the initial state condition, $(i^t)_t$ is an input vector sequence to the differential RNN, and $(o^t)_t$ is the output vector sequence produced by the differential RNN.

It is assumed a desired target vector sequence $(d^t)_t$ and a mask vector sequence $(m^t)_t$ which specify the target value $d_i^t$ for $o_i^t$ when $m_i^t=1$ and leaves $o_i^t$ unconstrained otherwise. In this case the subscript i indicates the component of the vectors. A differentiable loss function L is assumed to measure the similarity of the output o and the target d:

$$L(o,d) \tag{56}$$

The objective function is defined as:

$$E(W,V)=\Sigma_{p \in T}E_p(W,V) \tag{57}$$

$$E_p(W,V)=\Sigma_t m_p^t L(o_p^t, d_p^t) \tag{58}$$

Where p is indexing a training set of sequence triplets $(i^t)_t$, $(d^t)_t$, $(m^t)_t$, and $(o_p^t)_t$ is the response output sequence of the differential RNN for the input sequence $(i_p^t)_t$.

For each pattern, the gradient can be computed as:

$$\frac{\partial E_p(W,V)}{\partial W} = \sum_t g_p^t \frac{\partial o_p^t}{\partial W} \tag{59}$$

$$\frac{\partial E_p(W,V)}{\partial V} = \sum_t g_p^t \frac{\partial o_p^t}{\partial V} \tag{60}$$

$$g_p^t = m_p^t \frac{\partial L(o_p^t, d_p^t)}{\partial o_p^t} \tag{61}$$

The quantity $g_p^t$ is the gradient coming from the output. Further, $$\frac{\partial o_p^t}{\partial W} \text{ and } \frac{\partial o_p^t}{\partial V}$$

can be computed recursively in time via backpropagation using the chain rule.

The backpropgation actions are illustrated in FIG. 9. This figure is meant to complement FIG. 5 by showing the corresponding backpropagation steps. The vector $o_p^t$ is represented by $OUT_t$, and in the figure, the vector $g_p^t$ is represented by $$\frac{\partial E(OUT_t)}{\partial OUT_t}.$$

In typical stochastic gradient descent, the weights updates are done using:

$$W^{\tau+1} = W^\tau - \eta \frac{\partial E_p(W, V)}{\partial W} \quad (62)$$

$$V^{\tau+1} = V^\tau - \eta \frac{\partial E_p(W, V)}{\partial V} \quad (63)$$

Where τ indexes pattern presentations and η is the learning rate. The objective function can also contain regularizers, such as in:

$$E_p(W,V) = \Sigma_t m_p{}^t L(o_p{}^t, d_p{}^t) + R((i_p{}^t)_t, W, V) \quad (64)$$

The gradient of the regularizer is then added to the regular gradient and is backpropagated as such.

A training vector sequence is input into the differential RNN's trainable transition component. It is noted that each input vector in the sequence is entered sequentially into the differential RNN and that the states of the differential RNN are updated simultaneously and the output is generated also in sequence. The process is essentially the same for each training vector sequence entered. In the virtual differential RNN architecture shown in FIG. 5, the training vector is input into the virtual IN port 514 of the differential RNN. Each training vector has one or more input elements. Thus, while a single line is shown entering the trainable transition component, this could be shown as any number of lines, each representing one of the training vector's elements.

At each time step t an output vector is produced in response to the input vector at time t. The output vector is output from the trainable OUT component (if there is one) or directly from the state component (if there is no trainable OUT component). The trainable OUT component can be an off-the-shelf neural network. It can have its own regularizer, and it follows the standard backpropagation rules to compute its gradient.

In the virtual differential RNN architecture shown in FIG. 5, the output vector is output from the virtual OUT port 526 of the differential RNN. As with the training vector, the output vector has one or more output elements. Thus, while a single line is shown exiting the differential RNN, this could be shown as any number of lines, each representing one of the output vector's elements.

The error signal, or gradient $(g_p{}^t)_t$ is then computed. This error signal represents the difference between the output vector sequence produced in response to the input of the training input vector sequence, and the output pattern sequence that was expected from the input of the training input vector sequence, and modulated by the mask $(m_p{}^t)_t$ sequence. The error signal gradient is input into the virtual OUT port 900 of the differential RNN. It is noted that the error signal will be used and backpropagated from the trainable OUT component 902 if there is one in the differential RNN. Otherwise the error signal is passed on undisturbed. It is noted that the trainable OUT component 902 is shown as a dashed line box in FIG. 9 to indicate its optional nature.

In one implementation, each element of the gradient vector is divided by a function of the timestamp t. The function could be t or √t or some other function of t. This gradient normalizer 904 is illustrated in both the differential RNN and the expanded view in FIG. 9. This operation is not standard in the backpropagation algorithm, and indeed, it is not indicated in the forward propagation diagram in FIG. 5. The reason it is useful in this case is because the state component will accumulate gradients during the backpropagation and this gradient accumulation will affect the trainable weights of the trainable transition component in a manner that is proportional to either t (correlated gradient) or √t (uncorrelated gradients). The normalization is therefore a form of preconditioning that improves the convergence rate of the gradient descent algorithm. The gradient coming into the output of the state component 908 is denoted $$\alpha_t \frac{\partial E(OUT_t)}{\partial h_t}$$

where $a_t$ can be 1/t or 1/√t.

According to the chain rule and the standard backpropagation algorithm, the normalized gradient should be added with the gradient coming out of one of the inputs of the trainable transition component. In one implementation this step is skipped because a gradient blocker 906 is introduced, as illustrated in FIG. 9, to block contributions from the trainable transition component 912. The purpose of the gradient blocker 906 is to prevent the gradient from propagating and adding to itself along the loop that involves the state component 908, the differential linearity component 910 and the trainable transition component 912. Blocking the gradient forces the trainable transition component 912 to learn only transitions from the previous state and ignore all cumulative and recursive effects of state changes. This contributes to the stability of the system by preventing gradient explosion.

The next action is to pass the gradient to the output of the state component 908. In this action, a standard backpropagation algorithm is used. This implies that the gradient is added to the gradient from the previous time step before being passed along to the differential non-linearity component 910. Note that the gradient vector has one or more gradient elements. Thus, while a single line is shown entering the state component gradient component, this could be shown as any number of lines, each representing one of the gradient vector's elements. Each of the gradient vector elements corresponds to a different state being stored by the state component 908, and each entes a separate state loop (similar to a two state scenario associated with a stopwatch example that will be described later in connection with FIG. 14). The gradient coming out the input of the state component 908 is denoted $$\frac{\partial E^*(OUT_{\geq t})}{\partial y_t}$$

to reflect the fact that all the gradient coming from time steps that came after the current time step t and E* is accumulated and is used instead of E to reflect that fact that the chain rule has not been followed truthfully.

The gradient vector is then input into the differential non-linearity component 910. In the virtual differential RNN architecture shown in FIG. 9, the gradient vector is input into the virtual output of the differential non-linearity component 910. It will be remembered that the gradient vector has one or more gradient elements. Thus, while a single line is shown entering the differential non-linearity component 910, this could be shown as any number of lines, each representing one of the gradient vector's elements.

For each gradient element, $y^+$ and $y^-$ values are computed. For example, if there are 300 gradient elements, 300 $y^+$ values are computed and 300 $y^-$ are computed. As described previously, in one implementation, $y^+$ and $y^-$ values are computed based on the equations:

$$y = \sigma(y^+) - \sigma(y^-) \quad (65)$$

$$\sigma(x) = \max(0, x) \quad (66)$$

Given this, as shown in the differential non-linearity component 910 of the differential RNN gradient depicted in FIG. 9, the gradients coming out of the virtual input of the component can be denoted as $$\frac{\partial E^*(OUT_{\geq t})}{\partial y_t^+} \text{ and } \frac{\partial E^*(OUT_{\geq t})}{\partial y_y^-}.$$

Instead of multiplying the gradient by the derivative of the activation function $\sigma$, in one implementation, the gradient is multiplied by the derivative of a smoothed version $\sigma_a$ of the activation function $\sigma$.

$$\sigma_a(x) = \frac{1}{a} \log(1 + e^{ax}) \quad (67)$$

The reason is that the derivative of the activation function $\sigma$ is 0 for $y^+ \leq 0$ and for $y^- \geq 0$. This means that no gradient can go through when the system is in that state. Using the derivative of the smoothed version $\sigma_a$ is one of many ways to ensure that some gradient goes through. The value of a can be adjusted to make the gradient more truthful. The higher the value a, the more truthful the gradient is. At the extreme:

$$\lim_{a \to \infty} \sigma_a(x) = \max(0, x) = \sigma(x)$$

Thus, as shown in the expanded view of the differential non-linearity component 910 in FIG. 9, the gradients coming out of the virtual input of the component can be characterized as $g_t$ $$\frac{\partial \sigma_a(y_t^+)}{\partial y_t^+} \text{ and } g_t \frac{-\partial \sigma_a(-y_t^-)}{\partial y_t^-}.$$

The differential component can also implement a regularizer (not shown in FIG. 9) such as:

$$r_t \cdot \tfrac{1}{2}((y_t^+ + b)^2 + (y_t^- - b)^2) \quad (69)$$

or $$r_t y_t \quad (70)$$

The corresponding gradient can then be added to the gradient being currently backpropagated. For instance, the new gradient fed in the trainable transition component could be:

$$\frac{\partial E^*(OUT_{\geq t})}{\partial y_t^+} + r_t(y_t^+ + b) \quad (71)$$

$$\frac{\partial E^*(OUT_{\geq t})}{\partial y_t^-} + r_t(y_t^- - b) \quad (72)$$

Finally, the gradient is passed through the trainable transition component 912. The gradients for the weight W are accumulated there, and the weights are updated once all the gradient of the sequence have been accumulated. The trainable transition component 912 can have its own regularizer as in a Mirror DNN or an L2 or a L1 regularizer on W. This component trains like standard off-the-shelf neural network.

The gradient with respect to the input IN 914 can be passed out of the differential RNN component if a trainable component was used to compute the input. This gradient can be denoted as $$\frac{\partial E^*(OUT_{\geq t})}{\partial IN_t}.$$

In view of the foregoing, in one implementation, a system and process for training a differential RNN involves employing one or more computing devices to perform the following actions, where the computing devices are in communication with each other via a computer network whenever a plurality of computing devices is used. Referring to FIGS. 11A-E, the training generally includes first receiving a plurality of training sequence vectors (action 1100). Each of these training sequence vectors includes multiple groups of elements, each of which corresponds to a different time step. A previously unselected training sequence vector is selected (action 1102), and the elements of the selected vector corresponding to the current time step (which is initially the first time step in a sequence of time steps) are provided to the trainable transition component of the differential RNN (action 1104). As indicated previously, the trainable transition component includes a neural network. A current version of a state vector stored by a state component of the differential RNN is also provided to the trainable transition component (action 1106). The current version of the state vector has elements, each of which corresponds to a different element of the states being stored by the state component. The output of the trainable transition component is captured and includes a positive contribution vector and a negative contribution vector (action 1108). Each of these vectors has elements, each of which corresponds to a different element of the states being stored by the state component. The last-captured output of the trainable transition component is then provided to the differential non-linearity component of the differential RNN (action 1110). The output of the differential non-linearity component is then captured (action 1112). This output includes a state contribution vector having elements, each of which corresponds to a different element of the states being stored by the state component. The last-captured state contribution vector is provided to the state component (action 1114), which outputs an updated version of the state vector computed from the previous version of the state vector and the last-captured state contribution vector (action 1116). In one implementation (identified as Option A in FIG. 11B), the output of the state component is designated as a sequence output vector associated with the elements of the selected training sequence vector corresponding to the current time step (action 1118). Option A can be employed when the differential RNN does not include the aforementioned trainable OUT component. In another implementation (identified as Option B in FIG. 11B), the updated version of the state vector is first provided to the trainable OUT component of the differential RNN (action 1120), which performs post-processing on the updated version of the state vector and outputs a post-processed states vector. Then, the post-processed states vector is designated as a sequence output vector associated with the elements of the selected training sequence vector corresponding to the current time step (action 1122). Option B can be employed when the differential RNN includes the aforementioned trainable OUT component. It is then determined if the elements of the selected training sequence vector corresponding to the last time step in the sequence of time steps have been provided to the trainable transition component (action 1124). If not, the time step is incremented (action 1126), and actions 1104 through 1124 are repeated.

Once all the elements of the selected training sequence vector corresponding to each time step (including the last) have been selected and processed, a previously unselected sequence output vector is selected in reverse time step order starting with the last one computed (action 1128). A cost function is computed next based on the similarity between the selected sequence output vector and the associated elements of the training sequence vector corresponding to the same time step (action 1130). A gradient vector is then computed using the last-computed cost function (action 1132). The gradient vector has elements, each of which corresponds to a different one of the states being stored by the state component.

During backpropagation, in one implementation (identified as Option A in FIG. 11C), the last-computed gradient vector is provided to an output side of the state component of the differential RNN (action 1134). As before, Option A can be employed when the differential RNN does not include the aforementioned trainable OUT component. In another implementation (identified as Option B in FIG. 11C), the last-computed gradient vector is provided to the output side of the aforementioned trainable OUT component (action 1136), which is employed to modify a weight matrix of the neural network of the trainable OUT component. The last-computed gradient vector is also provided to the output side of the state component (action 1138). As before, Option B can be employed when the differential RNN includes the aforementioned trainable OUT component. The gradient vector provided to the state component is combined with a last previously-stored gradient vector to produce a current accumulated gradient vector (action 1140). The current accumulated gradient vector is then stored by the state component (action 1142). A copy of the last-stored current accumulated gradient vector is provided to an output side of the differential non-linearity component (action 1144), which in turn provides the copy to each branch of an adder (action 1146). One copy of the accumulated gradient vector is multiplied by the derivative of a first non-linearity function and the other copy of the vector is multiplied by a second non-linearity function, to produce a positive contribution gradient vector and a negative contribution gradient vector, respectively (action 1148). The pair of the positive and negative contribution gradient vectors is then provided to an output side of the trainable transition component (action 1150). The positive and negative contribution gradient vector pair is employed by the trainable transition component to modify the weigh matrix of the neural network via a normal backpropagation procedure in order to eventually train the neural network (action 1152). It is next determined if the sequence output vector corresponding to the first time step has been selected and processed (action 1154). If not, actions 1128 through 1154 are repeated. Otherwise, it is determined if any of the training sequence vectors have yet to be selected and processed (action 1156). If there are remaining unselected training sequence vectors, actions 1102 through 1156 are repeated. If not, the procedure ends. However, in one implementation, multiple iterations over the same training set could be employed to train the neural network. This would involve starting the training over with the previously-computed set of sequence output vectors, and performing a prescribed number of training iterations with these vectors. Each training iteration would involve repeating actions 1128 through 1154 until all the sequence output vectors have been considered. Once the prescribed number of training iterations have been performed using the last-computed set of sequence output vectors, action 1156 would be performed and the process including the multiple iteration training would be repeated for each remaining training sequence vector.

Each element of the gradient vector corresponds to a different state being stored by the state component. In one implementation, each gradient element is also normalized by dividing the element by a function of the current time step value before it is provided to the state component. This is the case regardless of whether Option A or Option B as described previously is employed. The function could be linear such as the time stamp or non-linear such as the square root of the time stamp. Each gradient element of the vector (normalized or not) is fed into the output side of the state component. This gradient vector is added to the current and existing gradient value vector in the state component during the backpropagation. At each time step, the accumulated gradient vector is duplicated and is fed to the output side of the differential non-linearity component.

As described previously, during backpropagation the differential non-linearity component of the differential RNN receives a gradient from its output. The gradient vector is copied to each branch of the adder and multiplied by the derivative of two non-linearity functions to produce two gradient vectors of the of the objective function, one with respect to the positive state component contribution vector and one with respect to the negative state component contribution vector. In one implementation, the gradient vector is multiplied by the derivative of an approximation of the non-linear functions instead of the true derivative. Such approximation can be obtained by smoothing the non-linear function. The purpose of this approximation is to improve the convergence of the gradient descent method by increasing the curvature of the Hessian of the objective function in regions where it would otherwise be flat. As indicated previously, the positive and negative contribution gradient vectors are fed from the output to the trainable transition component of the differential RNN. The trainable transition component includes a neural network which is trained by using the gradient vector signals from its output to modify the weight matrix of the neural network via a backpropagation procedure.

It is noted that the gradients coming out of the trainable transition component during backpropagation can be fed to output of the state component where they would be added to the incoming gradients (normalized or not). However, in an alternative implementation, these gradients are prevented from traveling backward along the loop that includes the state component, the differential non-linearity, and the trainable transition component (e.g., via the gradient blocker 906 shown in FIG. 9), and simply discarded (e.g., via the IN input 914 shown in FIG. 9). Thus, the gradients coming out of the trainable transition component during backpropagation would not be added to the incoming gradients.

5.0 Examples and Applications

The following sections describe examples of what the differential RNN can compute, as well as providing an exemplary application where learning long term dependencies is advantageously exploited.

5.1 Example 1: Memory Set/Recall

Figure 12:
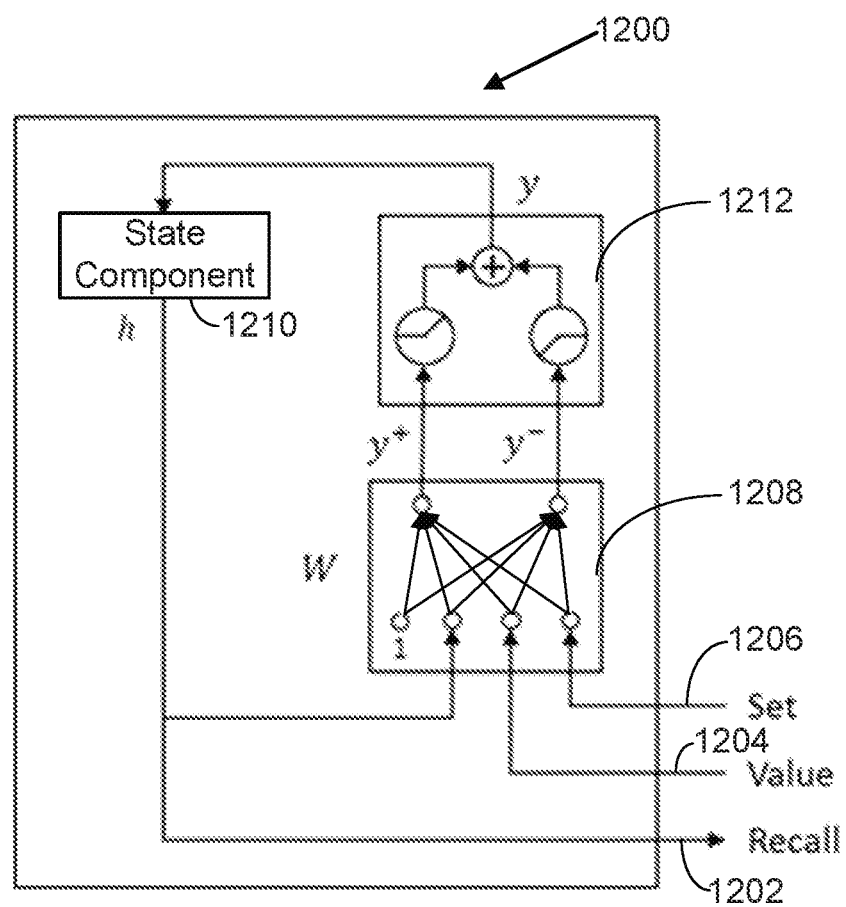
FIG. 12 is a diagram illustrating one implementation, in simplified form, of a memory implemented using a differential RNN architecture, where the memory has a single state providing a simple memory set/recall functionality.

To illustrate what the differential RNN architecture can compute, a simple memory 1200 is implemented. The memory 1200 can be read at any time from the output 1202. The output value comes from the state component 1210, and is also fed into the trainable transition component 1208. The differential non-linearity component 1212 completes the loop. This example illustrates how the function Set, which can also be viewed as Forget if the new value is 0, can be implemented even though the differential RNN does not have any gates, let alone a forget gate. The RNN receives a value Value from its input 1204, but it is only stored in memory when the Set input 1206 is 1. Otherwise, the Set input 1206 is assumed to be 0. The trainable transition component 1208 is a simple matrix W. In this example, the weights are set by hand, but they could of course be trained. This Memory Set/Recall functionality can be implemented with a single state and the architecture shown in FIG. 12.

With the non-linearity functions defined as:

$$y = \sigma(y^+) - \sigma(-y^-) \quad (73)$$

$$\sigma(x) = \max(x, 0), \quad (74)$$

If Set=1, and Value=v, Recall should be v for as long as Set=0. This is expressed as

| Set | Value | Next h | y | s(−h + Value) |
|-----|-------|--------|---|---------------|
| 0   |       | h      | 0 | 0             |
| 1   | v     | v      | −h + v | −h + v    |

This can be implemented with (chose V such that ∀v, V≥v):

$$W = \begin{bmatrix} -V & -1 & 1 & +V \\ +V & -1 & 1 & -V \end{bmatrix} \quad (75)$$

$$W \begin{bmatrix} 1 \\ x \\ v \\ s \end{bmatrix} = \begin{bmatrix} -V - h + Vs + v \\ +V - h - Vs + v \end{bmatrix} = \begin{bmatrix} y^+ \\ y^- \end{bmatrix} \quad (76)$$

| Set | Value | $y^+$ | $y^-$ | y |
|-----|-------|-------|-------|---|
| 0   |       | −V + v − h ≤ 0 | +V + v − h ≥ 0 | 0 |
| 1   | v     | v − h | v − h | v − h |

It is easy to verify that the architecture computes the desired function.

5.2 Example 2: Building Gates

Figure 13:
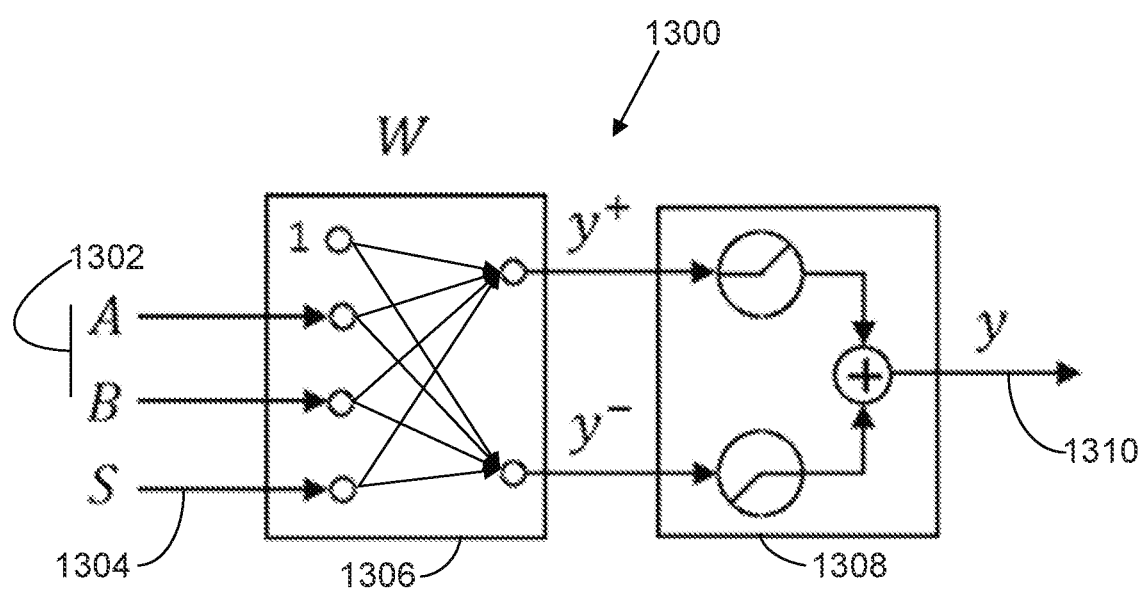
FIG. 13 is a diagram illustrating one implementation, in simplified form, of a logic gate implemented using a differential RNN architecture.

This example provides a guide to building simple nonlinear functions such as a logic gate 1300 using a portion of the differential RNN architecture. Assume A, B, . . . are a binary signal 1302 (taking values in {0, 1}), and S is a signal 1304 taking value in [−V, +V]. The architecture illustrated in FIG. 13 is employed, which includes the trainable transition component 1306 and the differential non-linearity component 1308. As the output 1310 of the logic gate does not need to be stored in this example, the state component is not used.

To implement y=(A∧B)S, choose:

$$W = \begin{bmatrix} -2V & +V & +V & 1 \\ +2V & -V & -V & 1 \end{bmatrix} \quad (77)$$

Proof:

$$\begin{bmatrix} -2V & +V & +V & 1 \\ +2V & -V & -V & 1 \end{bmatrix} \begin{bmatrix} 1 \\ A \\ B \\ S \end{bmatrix} = \begin{bmatrix} V(A-1) + V(B-1) + S \\ V(1-A) + V(1-B) + S \end{bmatrix} = \begin{bmatrix} y^+ \\ y^- \end{bmatrix} \quad (78)$$

| A | B | $y^+$ | $y^-$ | $y = \sigma(y^+) - \sigma(-y^-)$ | (A ∧ B)S |
|---|---|-------|-------|-------------------------------|----------|
| 0 | 0 | −2V + S ≤ 0 | 2V + S ≥ 0 | 0 | 0 |
| 0 | 1 | −V + S ≤ 0  | V + S ≥ 0  | 0 | 0 |
| 1 | 0 | −V + S ≤ 0  | V + S ≥ 0  | 0 | 0 |
| 1 | 1 | S           | S          | S | S |

This formula is easy to generalize to y=(A∧B∧C∧ . . . )S by expanding the matrix W. It is also easy to independently negate any of the binary variables. For instance, to negate B, replace (B−1) by −B. For instance, to compute= (A∧B̄)S, the matrix becomes:

$$W = \begin{bmatrix} -1V & +V & -V & 1 \\ +1V & -V & +V & 1 \end{bmatrix} \quad (79)$$

To implement y=(A∨B)S, choose:

$$W = \begin{bmatrix} -V & +2V & +2V & 1 \\ +V & -2V & -2V & 0 \end{bmatrix} \quad (80)$$

Proof:

$$\begin{bmatrix} -V & +2V & +2V & 1 \\ +V & -2V & -2V & 0 \end{bmatrix} \begin{bmatrix} 1 \\ A \\ B \\ S \end{bmatrix} =$$

$$\begin{bmatrix} 2V(A-1) + 2V(B-1) + 3V + S \\ 2V(1-A) + 2V(1-B) - 3V \end{bmatrix} = \begin{bmatrix} y^+ \\ y^- \end{bmatrix} \quad (81)$$

| A | B | $y^+$ | $y^-$ | $y = \sigma(y^+) - \sigma(-y^-)$ | (A ∨ B)S |
|---|---|-------|-------|-------------------------------|----------|
| 0 | 0 | −V + S ≤ 0 | V ≥ 0   | 0 | 0 |
| 0 | 1 | V + S ≥ 0  | −V ≤ 0  | S | S |
| 1 | 0 | V + S ≥ 0  | −V ≤ 0  | S | S |
| 1 | 1 | 3V + S ≥ 0 | −3V ≤ 0 | S | S |

Here too, this formula is easy to generalize to y=(A∨B∨C∨ . . . )S by expanding the matrix W. It is also easy to independently negate any of the binary variables. For instance, to negate B, we need to replace (B−1) by −B. For instance, to compute=(A∨B̄)S, the matrix becomes:

$$W = \begin{bmatrix} +V & +2V & -2V & 1 \\ -V & -2V & +2V & 0 \end{bmatrix} \quad (82)$$

5.3 Example 3: Stopwatch

Figure 14:
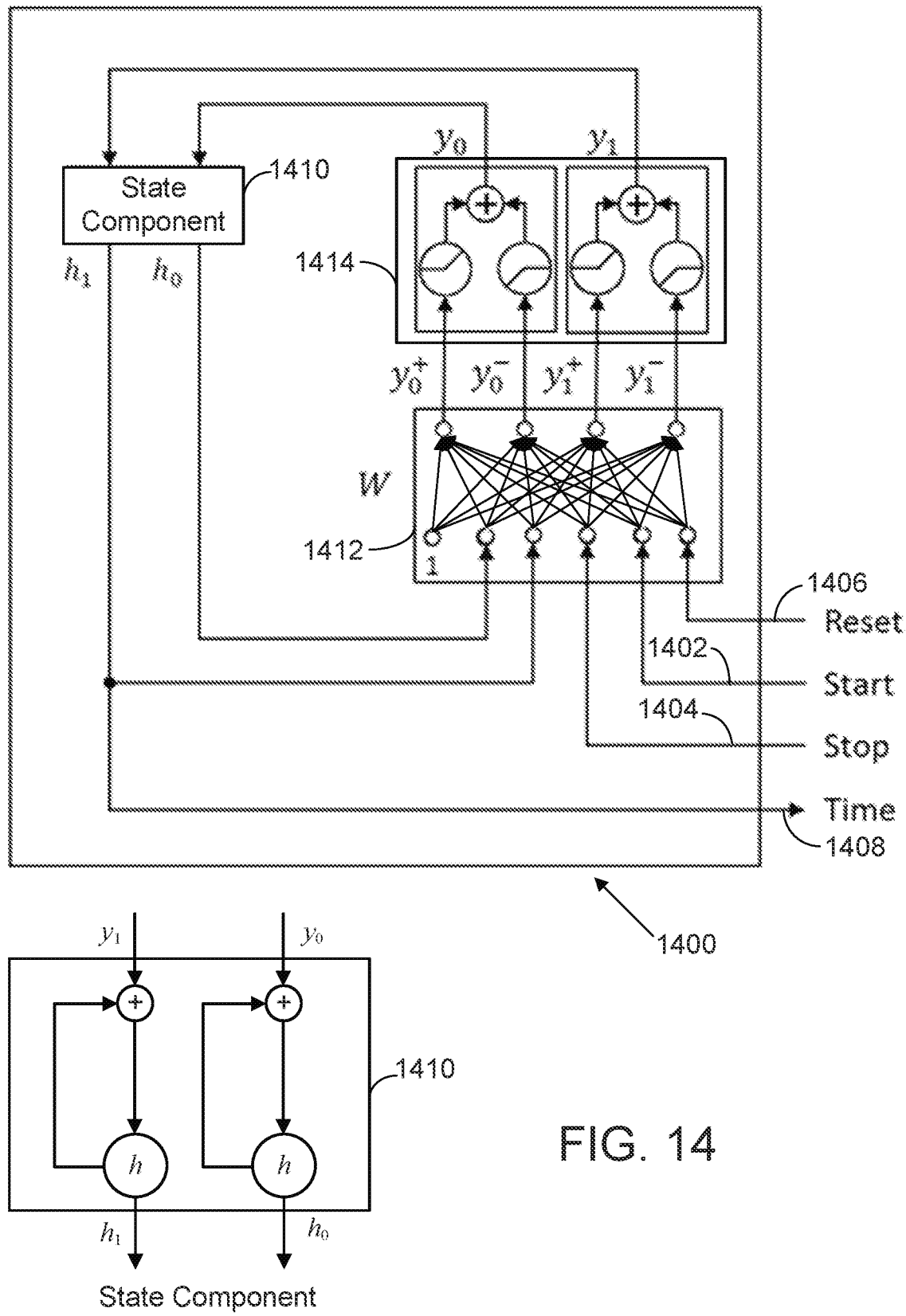
FIG. 14 is a diagram illustrating one implementation, in simplified form, of a counter in the form of a stop watch implemented using a differential RNN architecture.

This next example illustrates a two-state component and how the differential RNN can implement a counter. The stop watch 1400 has 3 inputs: Start 1402, Stop 1404, and Reset 1406. It has one output 1408, which counts the steps while the stopwatch is on. This functionality can be implemented with a two-state state component 1410 and a trainable transition component 1412 regularized to a linear function. The architecture is illustrated in FIG. 14.

With the non-linearity functions associated with the differential non-linearity component 1414 defined as:

$$y_0 = \sigma(y_0^+) - \sigma(-y_0^-) \quad (83)$$

$$y_1 = \sigma(y_1^+) - \sigma(-y_1^-) \quad (84)$$

$$\sigma(x) = \max(x, 0) \quad (85)$$

To show feasibility, let $x_0$ track whether the stop watch is on ($x_0=1$) or off ($x_0=0$). Use $x_1$ to count the time steps. The state of the next $x_0$ is given by the following table:

| Start | Stop | Next $x_0$ | $y_0$ | (Start $\lor$ Stop)($-x_0$ + Start) |
|---|---|---|---|---|
| 0 | 0 | $x_0$ | 0 | 0 |
| 1 | 0 | 1 | $-x_0 + 1$ | $-x_0$ + Start |
| 0 | 1 | 0 | $-x_0 + 0$ | $-x_0$ + Start |
| 1 | 1 | 1 | $-x_0 + 1$ | $-x_0$ + Start |

The Start and Stop are not assumed to be on at the same time. Assume there is a priority to Start over Stop when they are both on. With this assumption, notice that:

$$y_0 = (\text{Start} \lor \text{Stop})(-x_0 + \text{Start}) \quad (86)$$

Using the OR gate (y=(A$\lor$B)S) from Example 2, it is possible to implement $y_0$ for $V_0 \geq 1$ with:

$$W_0 = \begin{bmatrix} -V_0 & +2V_0+1 & 2V_0 & -1 \\ +V_0 & -2V_0 & -2V_0 & 0 \end{bmatrix} \quad (87)$$

$$W_0 \begin{bmatrix} 1 \\ \text{Start} \\ \text{Stop} \\ x_0 \end{bmatrix} = \begin{bmatrix} -V_0 + (2V_0+1)\text{Start} + 2V_0\text{Stop} - x_0 \\ +V_0 - 2V_0\text{Start} - 2V_0\text{Stop} \end{bmatrix} = \begin{bmatrix} y_0^+ \\ y_0^- \end{bmatrix} \quad (88)$$

And verify the computation with the table ($\sigma(y_0^+)=0$ for $y_0^+ \leq 0$ and $-\sigma(-y_0^-)=0$ for $y_0^- \geq 0$):

| Start | Stop | $y_0^+$ | $y_0^-$ | $y_0$ | (Start $\lor$ Stop)($-x_0$ + Start) |
|---|---|---|---|---|---|
| 0 | 0 | $-V_0 - x_0 + \text{Start} \leq 0$ | $V_0 \geq 0$ | 0 | 0 |
| 1 | 0 | $V_0 - x_0 + \text{Start} \geq 0$ | $-V_0 \leq 0$ | $-x_0$ + Start | $-x_0$ + Start |
| 0 | 1 | $V_0 - x_0 + \text{Start} \geq 0$ | $-V_0 \leq 0$ | $-x_0$ + Start | $-x_0$ + Start |
| 1 | 1 | $3V_0 - x_0 + \text{Start} \geq 0$ | $-3V_0 \leq 0$ | $-x_0$ + Start | $-x_0$ + Start |

The following table is used to compute the next $x_1$:

| Reset | Next $x_1$ | $y_1$ | $\overline{\text{Reset}}(-x_1) + x_0$ |
|---|---|---|---|
| 0 | $x_0 + x_1$ | $x_0$ | $x_0$ |
| 1 | $x_0$ | $x_0 - x_1$ | $x_0 - x_1$ |

To do this, it is possible to take advantage of the fact that $x_0 \geq 0$ and $-x_1 \leq 0$, and use $y_1^+$ to add $x_0$ and $y_1^-$ to add $\overline{\text{Reset}}(-x_1)$, using one of the gates from above. This yields the following matrix:

$$W_1 = \begin{bmatrix} 0 & 0 & 1 & 0 \\ V_1 & -V_1 & 0 & -1 \end{bmatrix} \quad (89)$$

$$W_1 \begin{bmatrix} 1 \\ \text{Reset} \\ x_0 \\ x_1 \end{bmatrix} = \begin{bmatrix} 0 + 0 + x_0 + 0 \\ V_1 - V_1 \text{Reset} + 0 - x_1 \end{bmatrix} = \begin{bmatrix} y_1^+ \\ y_1^- \end{bmatrix} \quad (90)$$

| Reset | $y_1^+$ | $y_1^-$ | $y_1$ | $\overline{\text{Reset}}(-x_1) + x_0$ |
|---|---|---|---|---|
| 0 | $x_0 \geq 0$ | $V_1 - x_1 \geq 2$ | $x_0$ | $x_0$ |
| 1 | $x_0 \geq 0$ | $-x_1 \leq 0$ | $x_0 - x_1$ | $x_0 - x_1$ |

The complete matrix W is:

$$W = \begin{bmatrix} -V_0 & 0 & 2V_0+1 & 2V_0 & -1 & 0 \\ +V_0 & 0 & -2V_0 & -2V_0 & 0 & 0 \\ 0 & 0 & 0 & 0 & 1 & 0 \\ V_1 & -V_1 & 0 & 0 & 0 & -1 \end{bmatrix} \quad (91)$$

With:

$$\begin{bmatrix} y_0^+ \\ y_0^- \\ y_0^+ \\ y_1^- \end{bmatrix} = W \begin{bmatrix} 1 \\ \text{Reset} \\ \text{Start} \\ \text{Stop} \\ x_0 \\ x_1 \end{bmatrix} \quad (92)$$

It is easy to verify that the architecture computes the desired function.

5.4 Applications that Require Learning Long Term Dependencies

The differential RNN can be used in applications that require learning long term dependencies. The function F and G can be implemented with any NNs, but using Mirror DNNs is advantageous. Mirror DNNs have the nice property of regularizing to a linear function. This makes both F and G easy to learn for simple functions, until non-linearities are required by the data. Note that the differential non-linearity component can be viewed as part of the Mirror DNN as described previously.

Figure 15:
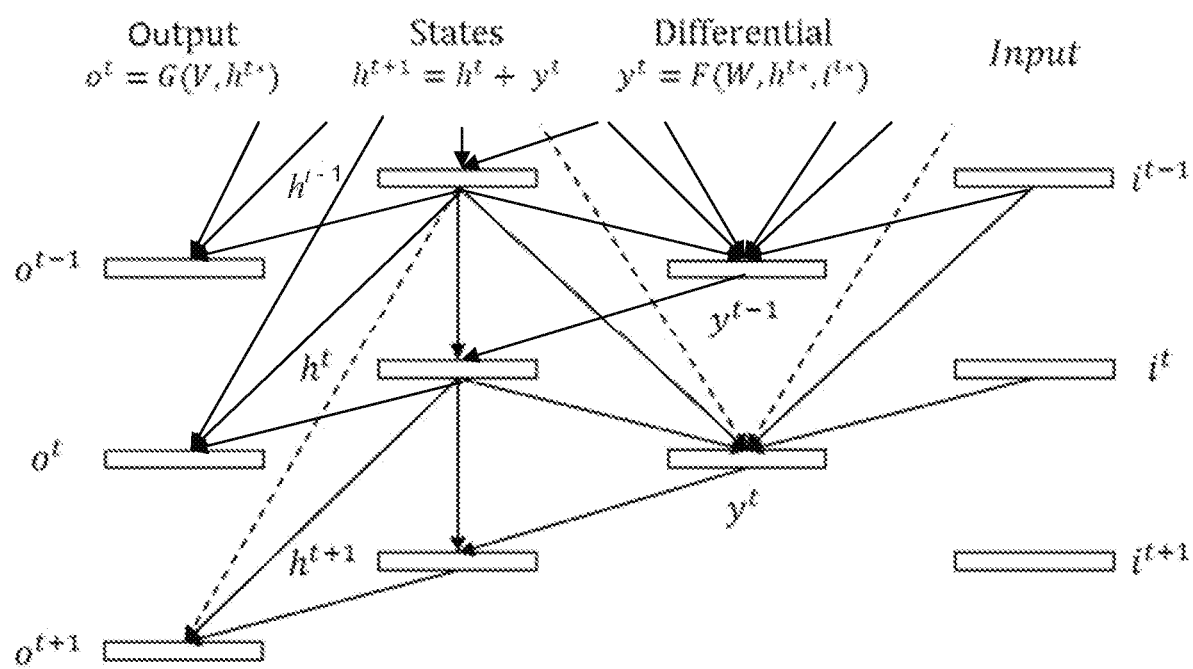
FIG. 15 is a diagram illustrating the computational flow of the differential, states and output components of the differential RNN unfolded in time, where the computational flow is convolutional (i.e., looking at multiple time steps over a window of size m).

Making F or G convolutional (looking at multiple time steps over a window of size m) has the advantage of taking some burden off the differential loop. Such modifications are depicted in FIG. 15. Assuming a convolution with a kernel of size m, the NN function F takes additional input $i'^* = [i^t, i^{t-1}, \ldots, i^{t-m+1}]$ and $h'^* = [h^t, h^{t-1}, \ldots, h^{t-m+1}]$. Like all RNNs, the weights W in $y^t$ are shared with the weights of $y^{t-1}$, all the way with the weights of $y^0$. The output function G can also be a convolution.

For instance, an event could be a particular variation of signal of the input combined with an existing state stored in the states component. If the variation is shorter than m steps, F can easily detect it through a convolution without having to learn a "differential detector" requiring a trajectory in the state space. Similarly, the target function may be a particular output variation of length less than m steps triggered by a particular state. As a convolution with a kernel of size m, the function G can easily create such variation without requiring a state trajectory in the differential loop. Depending on the detection and output requirements the functions F and G can have inputs from windows of different lengths.

Figure 16:
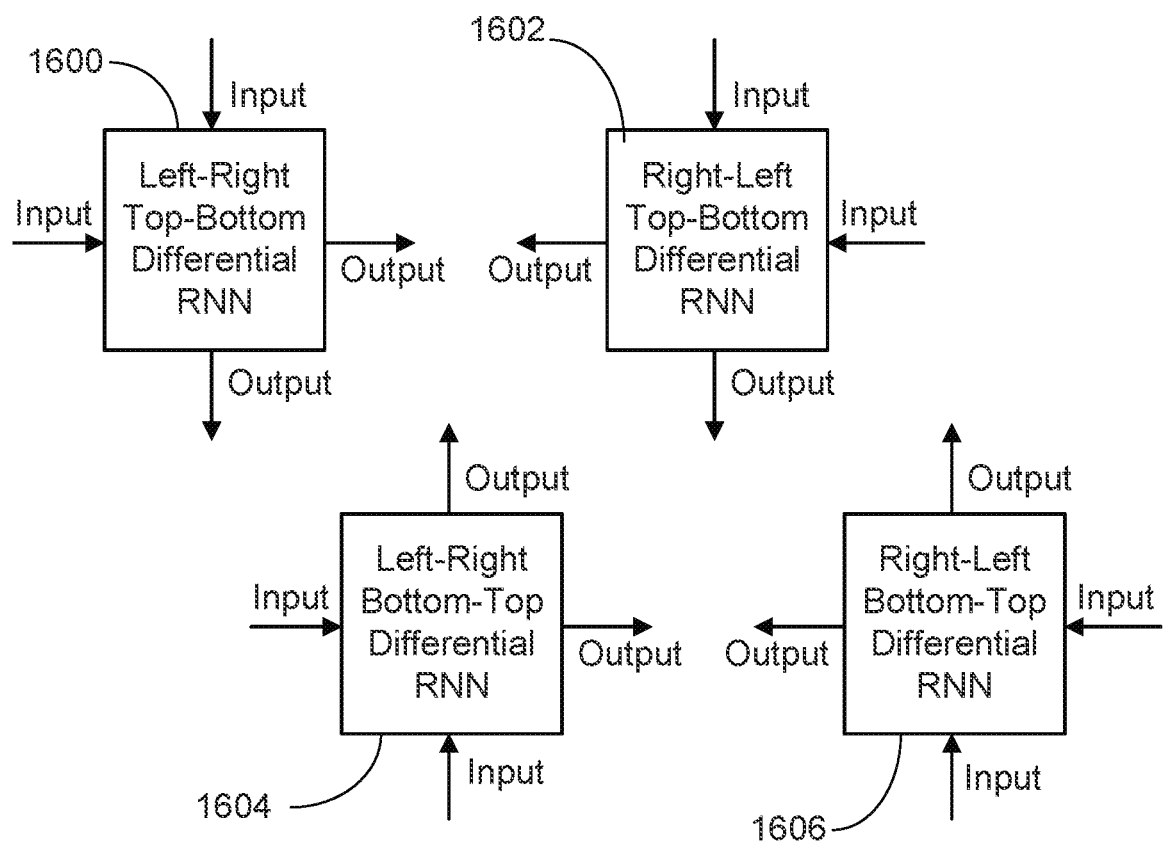
FIG. 16 is a diagram illustrating one implementation, in simplified form, of employing differential RNNs in 2D or 3D sequences, where the example illustrated involves processing 2D image sequences using four differential RNNs each corresponding to the four cardinal directions.

Finally, one can extend the differential RNN architecture to 2D or 3D sequences. For instance, in 2D, four differential RNN elements 1600, 1602, 1604, 1606 are employed in the example depicted in FIG. 16. With four types of elements 1600, 1602, 1604, 1606, each corresponding to the four cardinal directions, it is possible to process full images. First, compute from top left to bottom right to capture all North-East dependencies. Then, compute from top right to bottom left to capture all North dependencies, using previous computation as an input. Next, compute from bottom right to top left to capture all North and South-West dependencies, using previous computations as an input. And finally, compute from bottom left to top right to capture all dependencies from all directions, using previous computations as an input.

With four passes over the data, using the states of the previous differential RNN computation as additional input, it is possible to capture dependencies from all directions. It is noted that the states of each of the 4 modules is input into the trainable OUT component to compute the final OUT for each pixels of the image. The trainable OUT component is not optional in this case. In addition, it is the gradient coming from the trainable OUT module's 4 inputs that are used to feed the training of the 4 sub modules. Further, the input field of each element can be a window in the corresponding quadrant, and the transition function can be a type of Mirror DNN. The weights of each element are shared across all the elements of the same cardinal direction in the whole image.

This type of differential RNN can do things that an ordinary convolution NN cannot do. For instance, context can be propagated to distinguish the faces of people in a painting from the faces of people standing in front of the painting. The context here is whether the person extends beyond the painting's frame. The differential RNN can also compute relative scale by counting the distance between context changes (as seen previously with how easy it is to implement a counter). The differential RNN can in theory learn affine transformation invariance, without being limited by the size or shape of the receptive field of convolutions.

6.0 Other Implementations

While the differential RNN has been described by specific reference to implementations thereof, it is understood that variations and modifications thereof can be made without departing from the true spirit and scope of the differential RNN. It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

7.0 Exemplary Operating Environments

Figure 17:
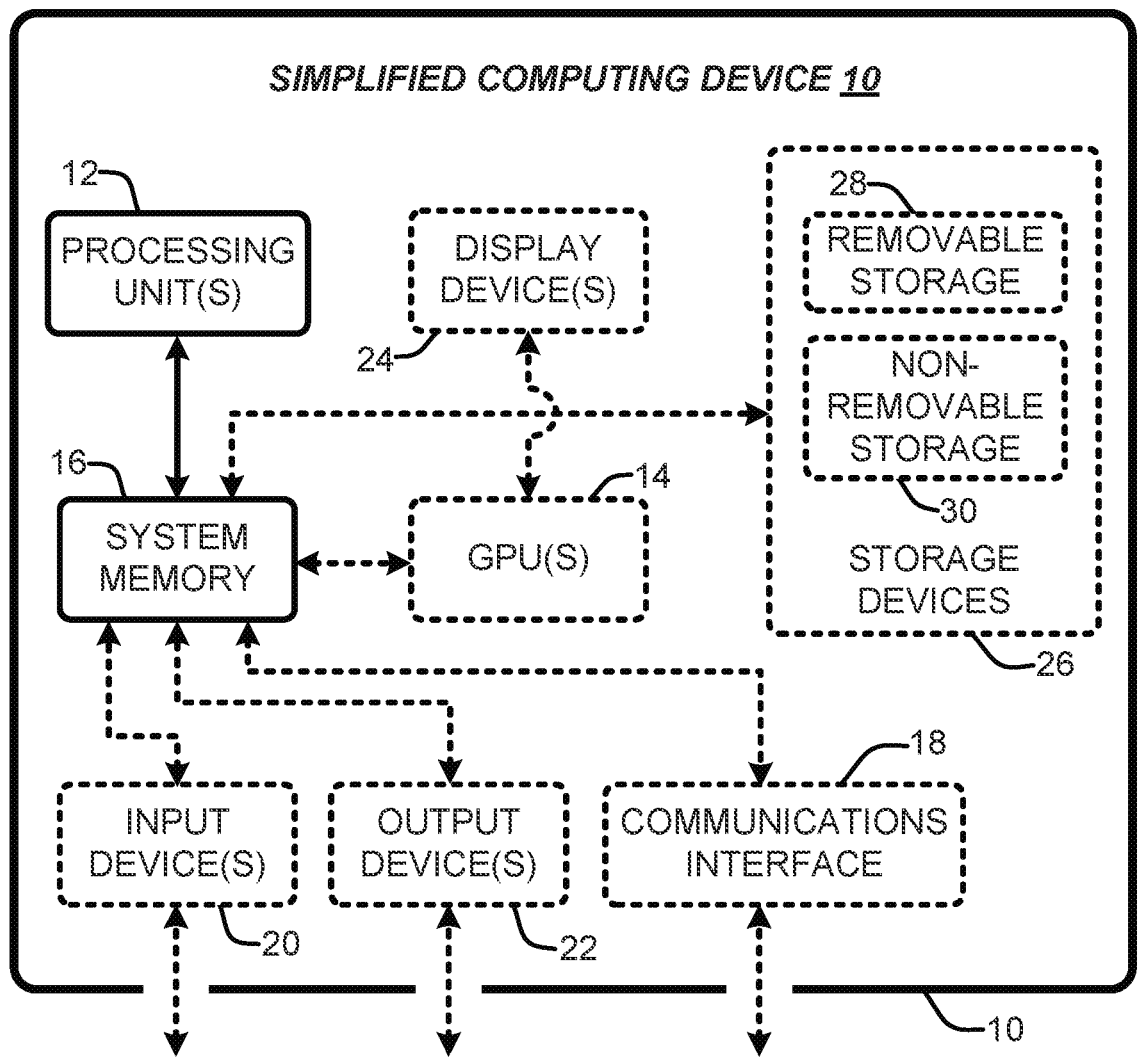
FIG. 17 is a diagram illustrating a simplified example of a general-purpose computer system on which various implementations and elements of a differential RNN, as described herein, may be realized.

The differential RNN implementations described herein are operational within numerous types of general purpose or special purpose computing system environments or configurations. FIG. 17 illustrates a simplified example of a general-purpose computer system on which various implementations and elements of the differential RNN, as described herein, may be implemented. It is noted that any boxes that are represented by broken or dashed lines in the simplified computing device 10 shown in FIG. 17 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the differential RNN implementations described herein, the device should have a sufficient computational capability and system memory to enable basic computational operations. In particular, the computational capability of the simplified computing device 10 shown in FIG. 17 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the differential RNN implementations described herein, including input, output, control, feedback, and response to one or more users or other devices or systems associated with the differential RNN implementations, are enabled by a variety of Natural User Interface (NUI) scenarios. The NUI techniques and scenarios enabled by the differential RNN implementations include, but are not limited to, interface technologies that allow one or more users user to interact with the differential RNN implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the differential RNN implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the differential RNN implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 17 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various differential RNN implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/ or engineering techniques to produce software, firmware, hardware, or any combination thereof to control a computer to implement the disclosed subject matter. The term "article of manufacture" as used herein is intended to encompass a computer program accessible from any computer-readable device, or media.

The differential RNN implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The differential RNN implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

The invention claimed is:

1. A differential recurrent neural network (RNN), the differential (RNN) trained by a training process comprising:
    providing, by a state component storing different states, a sequence output vector, the sequence output vector being associated with elements of a training sequence vector corresponding to a time step;
    generating a cost function based on a similarity between the sequence output vector and the associated elements of the training sequence vector;
    generating a gradient vector including elements, each element corresponding to a different state stored by the state component;
    combining the gradient vector with a previously stored gradient vector to generate an accumulated gradient vector;
    providing the accumulated gradient to a differential component and generating a positive contribution gradient vector and a negative contribution gradient vector based on the accumulated gradient vector; and
    providing the positive contribution gradient vector and the negative contribution gradient vector to a transition component, wherein one or more weights associated with a neural network of the transition component are modified based on the positive contribution gradient vector and the negative contribution gradient vector.

2. The differential RNN according to claim 1, wherein the training process to train the differential RNN further comprises:
    preventing gradients generated by the transition component from reaching the state component.

3. The differential RNN according to claim 1, wherein the providing the accumulated gradient to a differential component comprises providing the accumulated gradient to an output side of the differential component which in turn provides copies of the accumulated gradient to each branch of an adder.

4. The differential RNN according to claim 3, wherein the copies include a first copy and a second copy, and wherein the first copy is multiplied by the derivative of a first non-linearity function and the second copy is multiplied by a second non-linearity function to generate the positive contribution gradient vector and the native contribution gradient vector.

5. The differential RNN according to claim 1, wherein the accumulated gradient vector is stored by the state component.

6. The differential RNN according to claim 1, wherein the training process to train the differential RNN further comprises an action of, prior to combining the gradient vector with a previously-stored gradient vector to generate an accumulated gradient vector, dividing the gradient vector by a normalization value computed based on the time step corresponding to the training sequence vector.

7. The differential RNN according to claim 1, wherein the positive contribution gradient vector and the negative contribution gradient vector include elements, and wherein each element of the positive and negative contribution gradient vectors is regularized by the differential component by adding a regularization term onto the value of the gradient element.

8. A method for training a differential recurrent neural network (RNN), the method comprising:
    receiving a sequence output vector, the sequence output vector being associated with elements of a training sequence vector corresponding to a time step;

computing a cost function based on a similarity between the sequence output vector and the associated elements of the training sequence vector;

computing a gradient vector including elements, each element corresponding to a different state stored by the state component;

combining the gradient vector with a previously stored gradient vector to generate an accumulated gradient vector;

providing the accumulated gradient to a differential component and generating a positive contribution gradient vector and a negative contribution gradient vector based on the accumulated gradient vector; and providing the positive contribution gradient vector and the negative contribution gradient vector to a transition component, wherein a neural network of the transition component is updated based on the positive contribution gradient vector and the negative contribution gradient vector.

9. The method of claim 8, further comprising:

preventing gradients generated by the transition component from reaching the state component.

10. The method of claim 8, wherein the providing the accumulated gradient to a differential component comprises providing the accumulated gradient to an output side of the differential component which in turn provides copies of the accumulated gradient to each branch of an adder.

11. The method of claim 10, wherein the copies include a first copy and a second copy, and wherein the first copy is multiplied by the derivative of a first non-linearity function and the second copy is multiplied by a second non-linearity function to generate the positive contribution gradient vector and the native contribution gradient vector.

12. The method of claim 8, wherein the accumulated gradient vector is stored by the state component.

13. The method of claim 8, further comprising, prior to combining the gradient vector with a previously-stored gradient vector to generate an accumulated gradient vector, dividing the gradient vector by a normalization value computed based on the time step corresponding to the training sequence vector.

14. The method of claim 8, wherein the positive contribution gradient vector and the negative contribution gradient vector include elements, and wherein each element of the positive and negative contribution gradient vectors is regularized by the differential component by adding a regularization term onto the value of the gradient element.

15. A system for training a differential recurrent neural network (RNN), the system comprising:

a processor; and memory storing instructions that, when executed by the processor, cause the system to perform a set of operations, the set of operations comprising:

generating a cost function based on a similarity between a sequence output vector and associated elements of a training sequence vector, wherein the training sequence vector corresponds to a time step;

generating a gradient vector including elements, each element corresponding to a different state stored by the state component;

combining the gradient vector with a previously stored gradient vector to generate an accumulated gradient vector;

providing the accumulated gradient to a differential component and generating a positive contribution gradient vector and a negative contribution gradient vector based on the accumulated gradient vector; and providing the positive contribution gradient vector and the negative contribution gradient vector to a transition component, wherein one or more weights associated with a neural network of the transition component are modified based on the positive contribution gradient vector and the negative contribution gradient vector.

16. The system of claim 8, wherein the set of operations further comprise:

preventing gradients generated by the transition component from reaching the state component.

17. The system of claim 8, wherein the providing the accumulated gradient to a differential component comprises providing the accumulated gradient to an output side of the differential component which in turn provides copies of the accumulated gradient to each branch of an adder.

18. The system of claim 10, wherein the copies include a first copy and a second copy, and wherein the first copy is multiplied by the derivative of a first non-linearity function and the second copy is multiplied by a second non-linearity function to generate the positive contribution gradient vector and the native contribution gradient vector.

19. The system of claim 8, wherein the set of operations further comprises, prior to combining the gradient vector with a previously-stored gradient vector to generate an accumulated gradient vector, dividing the gradient vector by a normalization value computed based on the time step corresponding to the training sequence vector.

20. The system of claim 8, wherein the positive contribution gradient vector and the negative contribution gradient vector include elements, and wherein each element of the positive and negative contribution gradient vectors is regularized by the differential component by adding a regularization term onto the value of the gradient element.

* * * * *